United States Patent
Rapoza et al.

(10) Patent No.: US 6,561,811 B2
(45) Date of Patent: May 13, 2003

(54) DRUG ABUSE PREVENTION COMPUTER GAME

(75) Inventors: Darion Rapoza, Durham, NC (US); William Eldridge Urquhart, Wetumpka, AL (US)

(73) Assignee: Entertainment Science, Inc., Durham, NC (US)

( * ) Notice: Subject to any disclaimer, the term of this patent is extended or adjusted under 35 U.S.C. 154(b) by 0 days.

(21) Appl. No.: 10/102,270

(22) Filed: Mar. 20, 2002

(65) Prior Publication Data

US 2003/0017439 A1 Jan. 23, 2003

Related U.S. Application Data

(63) Continuation of application No. 09/370,461, filed on Aug. 9, 1999, now abandoned.

(51) Int. Cl.[7] ............................................... G09B 19/00
(52) U.S. Cl. ............................... 434/236; 463/1; 463/9; 434/307 R
(58) Field of Search ............................. 434/236, 307 R; 463/1–7; 424/322, 323, 118

(56) References Cited

U.S. PATENT DOCUMENTS

| | | | |
|---|---|---|---|
| 4,571,682 A | | 2/1986 | Silverman |
| 4,738,451 A | * | 4/1988 | Logg ..................... 273/153 R |
| 5,044,959 A | | 9/1991 | Shaver |

(List continued on next page.)

FOREIGN PATENT DOCUMENTS

| | | | |
|---|---|---|---|
| EP | 0927566 A1 | * | 7/1999 |
| WO | PCT/ES98/00181 | | 12/1998 |

OTHER PUBLICATIONS

Ultima Online Official User'Guide, copyright 1997 Origin Systems, pp. 10–16,18,30,34–36,102,226–241,280–281.*

SMACK: A Computer Driven Game for At–Risk Teens by Coraine Oakley Published in: Computers in Human Services vol. 11, No. 1/2, 1994 pp97–99.

Conditional reinforcing effects of capsules associated with high versus low monetary payoff by Chris–Ellyn Johanson, Adande Mattox and Charles R. Schuster Published in Psychopharmacology (1995) 120: 42–48.

(List continued on next page.)

*Primary Examiner*—Joe H. Cheng
*Assistant Examiner*—Kathleen M Christman
(74) *Attorney, Agent, or Firm*—Daniels & Daniels, P. A.

(57) ABSTRACT

An intervention method in which computer-based role-playing games are utilized to allow players to experience simulated effects of substance abuse on the individual, family, friends, and community, and thus learn by experience to avoid the adverse consequences of drug abuse through abstinence, promotion of abstinence by others, and treatment and correction of substance abusers. Role-playing games allow players to pretend to be a character in a story, much like being in a play. Each player takes the role of a character in the story, making the decisions and saying the things that character would say in the situations that happen along the way. Game objectives are set which the player or players attempt to complete through game-play. The intervention method involves realistically portraying the consequences of substance abuse and its interference with the individual's or group's chances of meeting the game objectives. To better meet the game objectives, players must practice social resistance skills, and are rewarded for avoiding drugs as well as for helping other characters avoid drug use. Thus, within the safety of the role-playing game environment, conditioned learning is used to teach players to avoid substance abuse as they learn by experience about the effects of drugs, their adverse consequences, how to resist pressures to use drugs and how to help others to do so as well.

26 Claims, 3 Drawing Sheets

U.S. PATENT DOCUMENTS

| | | | |
|---|---|---|---|
| 5,678,571 A | | 10/1997 | Brown |
| 5,730,654 A | | 3/1998 | Brown |
| 5,813,863 A | * | 9/1998 | Sloane et al. ............... 434/236 |
| 5,828,943 A | | 10/1998 | Brown |
| 5,833,466 A | | 11/1998 | Borg |
| 5,951,300 A | | 9/1999 | Brown |
| 5,967,789 A | | 10/1999 | Segel et al. |
| 6,102,406 A | * | 8/2000 | Miles et al. ................ 273/430 |
| 6,106,399 A | * | 8/2000 | Baker et al. .................. 463/42 |
| 6,126,544 A | * | 10/2000 | Kojima ........................ 463/31 |
| 6,210,272 B1 | * | 3/2001 | Brown .......................... 463/1 |

OTHER PUBLICATIONS

Increasing opiate abstinence through voucher–based reinforcement therapy by Kenneth Silverman et al. Published in Drug and Alcohol Dependence 41 (1996) pp 157–165.

Sustained Cocaine Abstinence in Methadone Maintenance Patients Through Voucher–Based Reinforcement Therapy by Kenneth Silverman et al. Published in Arch Gen Psychiatry 1996; 53: pp 409–415.

Incentives Improve Outcome in Outpatient Behaviorial Treatment of Cocaine Dependence By Stephen T. Higgins et al. Published in Arch Gen Psychiatry 1994:51: 568–576.

A Computerized Marijuana Decision Maze: Expect Opinion Regarding Its Use in Health Education by Kathryn Henningson, Robert Gold and David Duncan Published in J. Drug Education vol. 16 (3), 1986.

Computer Integrated Drug Prevention: A New Approach to Teach Lower Socioeconomic 5th and 6th Grade Israeli Children to Say No To Drugs by Michael Gropper et al. Published in Social Work in Health Care, vol. 22 (2) 1995.

Computer–Assisted Drug Prevention by James G. Barber Published in Journal of Substance Abuse Treatment, vol. 7, pp 125–131 1990.

* cited by examiner

DRUG ABUSE PREVENTION COMPUTER GAME

This application is a continuation of application Ser. No. 09/370,461 filed Aug. 9, 1999, now abandoned.

A portion of the disclosure of this patent document contains material that is subject to copyright protection. The copyright owner has no objection to the facsimile reproduction by any-one of the patent document or patent disclosure, as it appears in the Patent and Trademark Office patent file or records, but otherwise reserves all copyrights whatsoever.

FIELD OF THE INVENTION

The invention relates to an interactive computer-based role-playing game to promote abstinence from substance abuse.

BACKGROUND OF THE INVENTION

Key components of effective drug abuse prevention programs have been identified by extensive research on the effectiveness of existing drug abuse interventions. Some of these key components are:

1) The approach should be research based/theory driven. Research that focuses on tests of theory-driven ideas and that successfully incorporates tests of hypotheses permits the design of interventions that rely on methods proven to be effective, while discarding those methods proven to be ineffective.
2) The approach should deliver developmentally appropriate information about drugs. Children and adolescents are more interested in concrete information on the here and now experience than they are in information about possible effects in the distant future.
3) Social resistance skills training should be incorporated. These programs help prepare individuals to identify pressures to use drugs, and give them the skills they need to resist peer pressure to use drug's while maintaining their friendships.
4) Interactive teaching techniques should be used. Successful drug abuse resistance curricula tend to use role-playing, discussions and small group activities to promote the active participation of the students.
5) Adequate coverage and sufficient follow up. The effectiveness of interventions in preventing subsequent substance abuse increases with increased exposure to the key components of the intervention, and decays over time since the last exposure to intervention.
6) Evaluation. It is important to be able to evaluate the success of the approach to demonstrate its effectiveness, and to identify the key components of the approach that make it effective so that they may better be exploited in future revisions of the method.
7) Peer group involvement in teaching. It has been widely reported that in prevention curricula the use of peers to deliver substance abuse prevention information greatly enhances program effectiveness. Furthermore, Oetting and coworkers have suggested that the peer cluster, which they define as the small intimate group who share beliefs and values, mediates the influence of other psychosocial variables on drug abuse.
8) Identified correlates of substance abuse which are likely to play causative roles in either facilitating or preventing substance abuse should be addressed. For example, contrary to popular belief, the data suggest little correlation between knowledge about the medical effects of drugs and drug use, but the same data reveal a high correlation between perceptions that drug use is incompatible with the individual's life objectives and the individual's abstention from drug experimentation. The data suggest that prevention efforts should emphasize the incompatibility of substance abuse with the achievement of life plans and the negative psychological and social consequences of drug use.

Figure 1:
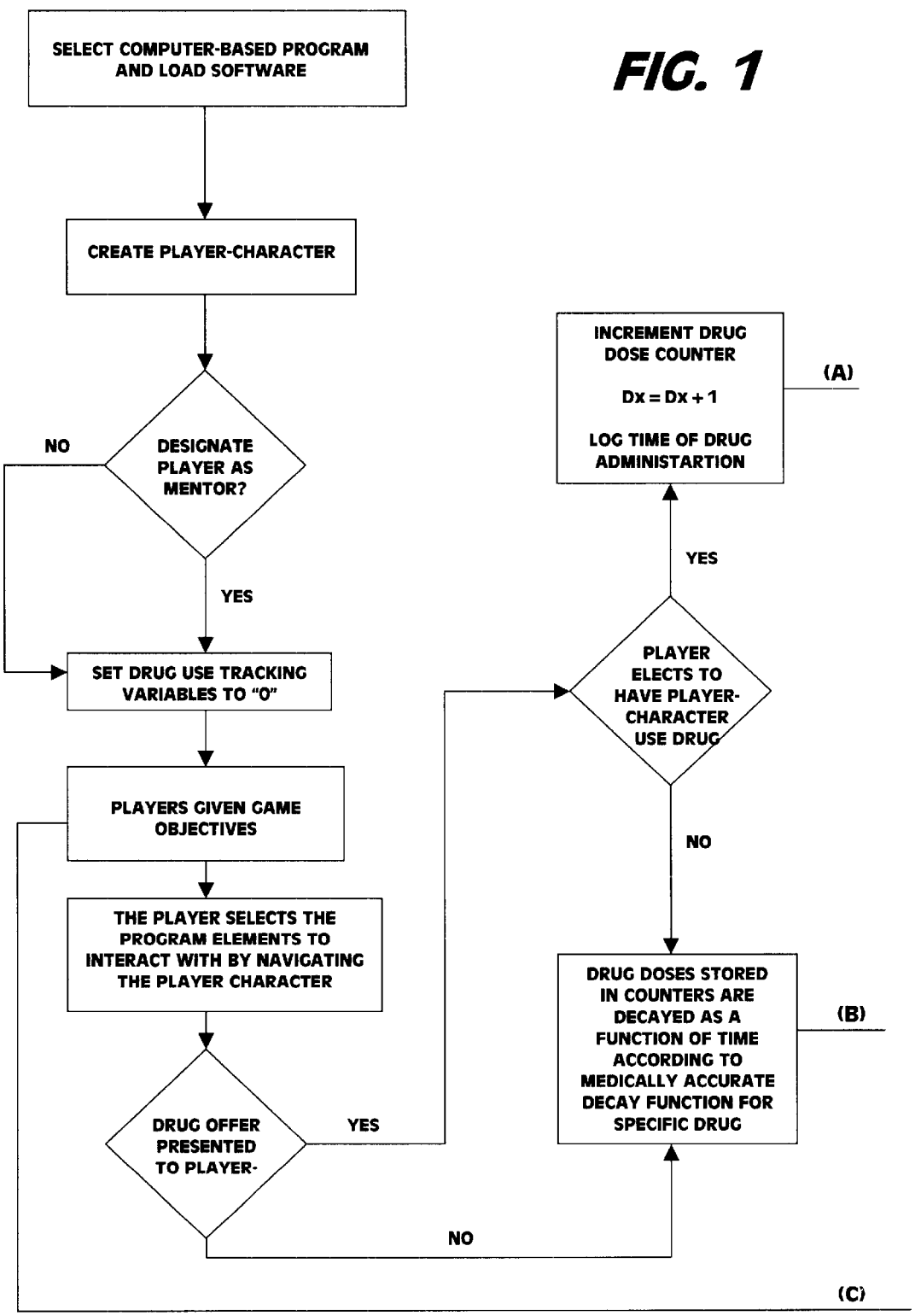
FIGS. 1–3 is a flowchart illustrating an example game of one embodiment of the present invention.
Figure 2:
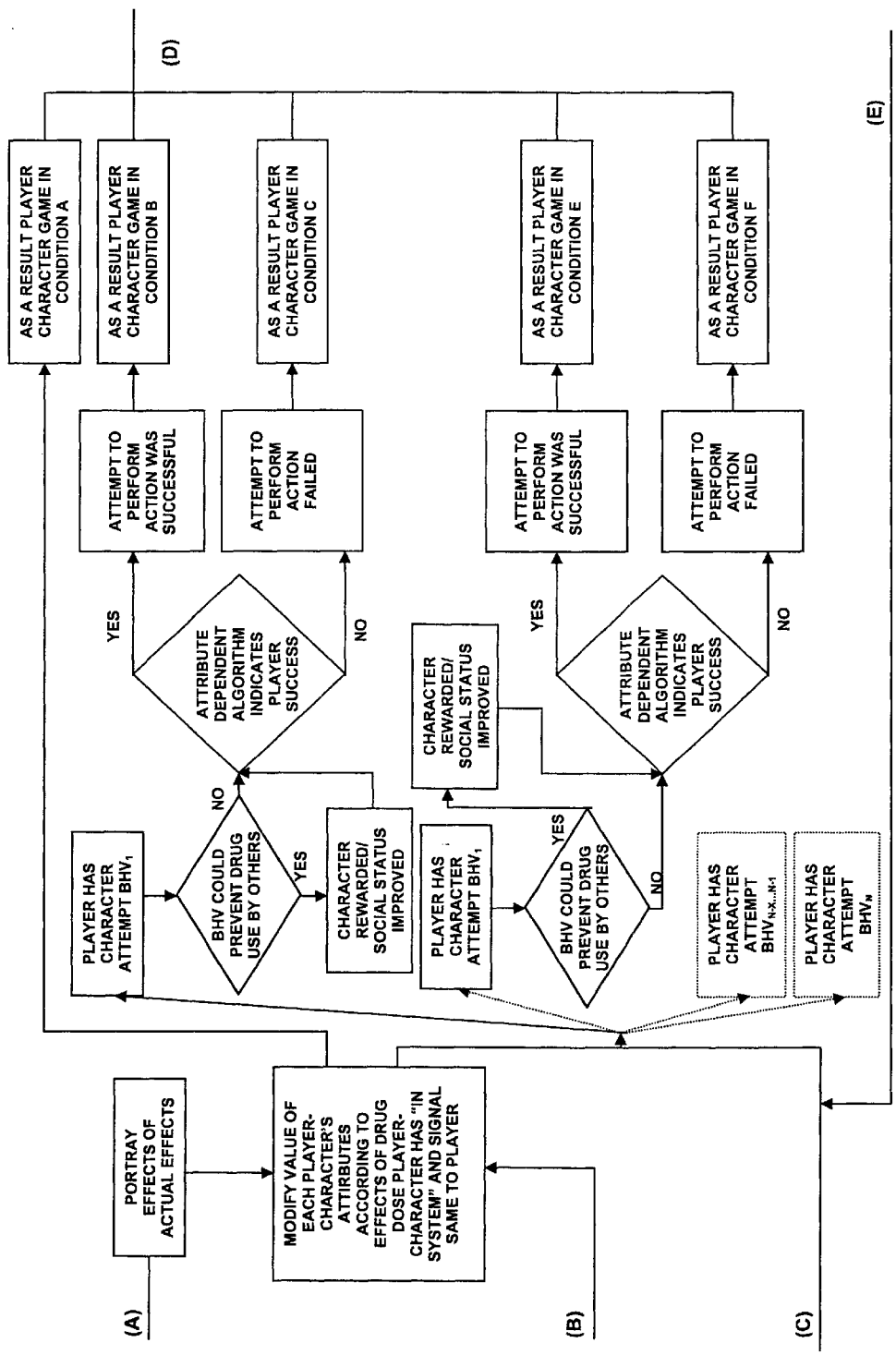
Figure 3:
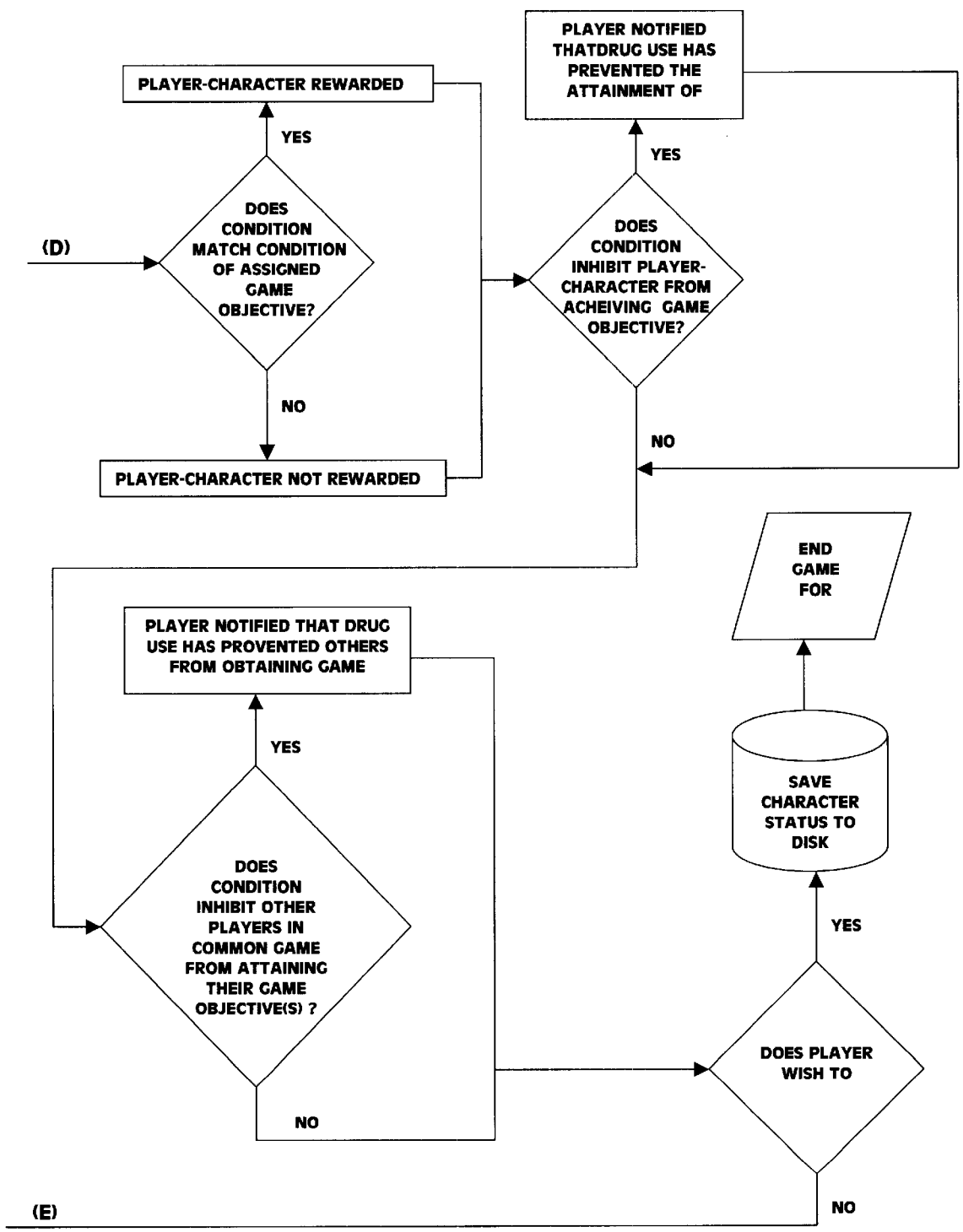

Operant psychology is an experimental science concerned with the role of the environment in controlling behavior. Operant psychology seeks to determine how the characteristics of behavior and its probability of occurrence are determined by 1) the environmental conditions that precede and accompany the behavior (cues), 2) the environmental changes that occur as a consequence of the behavior (consequences), and 3) the organism's previous experience with the environment (behavioral history). Through experimentation and hypothesis testing, behavioral analysts have generated a wealth of knowledge about the lawful relationships that govern the environmental control of behavior.

At the core of the conceptual framework of behavioral analysis is the occasion, behavior, consequence relationship. An occasion is a set of distinct environmental conditions under which behavior predictably results in the contingent presentation of a consequence; behavior is anything the subject does; and consequences are those events that follow the behavior closely in time. On any given occasion, a variety of behaviors may be possible. The specific behavior exhibited on a given occasion, however, is heavily influenced by past experience with the consequences of similar behavior on similar occasions in the past. If the appearance of a stimulus as a consequence of a behavior (e.g., fruit is delivered when I press a button) increases the probability that that behavior will reoccur on similar occasions in the future (I learn to press the button for fruit), the stimulus is termed a positive reinforcer. If the removal of a stimulus as a consequence of behavior increases the probability that the behavior will reoccur in the future, the stimulus is termed an aversive stimulus or a negative reinforcer (e.g., I learn to turn off a power switch to escape an electrical shock).

Behaviors may result in reinforcement on some occasions but not others. When a behavior is repeatedly reinforced in the presence of a stimulus, but the behavior is not reinforced in the absence of the stimulus, the stimulus is said to set the occasion for reinforcement (e.g., if pressing a lever delivers food treats only when a light above the lever is illuminated, the light's illumination sets the occasion for reinforcement). When the behavior comes to be expressed at a high rate in the presence of the stimulus, and at only a low rate in its absence, the stimulus is said to control behavior, and is referred to as a discriminative stimulus. (illuminating the light elicits high rates of lever pressing).

Of particular interest to the present invention are generalization, conditioned reinforcement, and conditioned avoidance. Generalization is the process by which behavior that is elicited by a discriminative stimulus can be elicited by a second, similar stimulus that differs slightly from the first along some dimension. For example, if a pigeon is trained to respond for food during illumination of a red stimulus light, it will also respond (initially at a somewhat lower rate) during illumination of a reddish-orange stimulus light. The more dissimilar the second stimulus is from the stimulus subjects were trained to respond to, the less likely stimulus generalization is to occur (thus, in our example, it is unlikely a blue stimulus light would elicit responding).

Some stimuli are initially neutral, but become reinforcers because of their association with reinforcement in the previous experience of a subject. These stimuli are called secondary or conditioned reinforcers to distinguish them from unconditioned (i.e., innate), or primary reinforcers, which require no experience to be effective. Just as there are two kinds of primary reinforcers, there are two kinds of conditioned reinforcers. Positive conditioned reinforcers are those whose presentation is reinforcing, while negative conditioned reinforcers or conditioned aversive stimuli are those whose withdrawal is reinforcing. To illustrate, if illumination of a green button has been established as a discriminative stimulus signaling the availability of food contingent on pressing the button, subjects can be trained to perform a task (e.g., press a red button) in order to illuminate the green button. The behavior of pressing the red button is maintained by the conditioned reinforcement of illumination of the green button. On the other hand, if a subject receives an electric shock when a red light is illuminated, the red light will become a conditioned aversive stimulus, and the subject can readily be trained to perform a response to extinguish the red light (conditioned avoidance).

The efficacy of a conditioned reinforcer is determined by many factors. Three of the most important factors are: 1) The efficacy of a conditioned reinforcer increases with higher frequencies of pairing with the primary reinforcer on which it is based; 2) The schedule of presentations of the stimulus on which the conditioned reinforcer is based also helps determine its efficacy. For example, behavior is easily acquired under a fixed ratio (FR) of 1 schedule (FR 1, each response is followed by reinforcement), but behavior maintained by a FR 1 schedule is also readily extinguished. In contrast, behavior is less readily established, but more resistant to extinction, under a variable ratio (VR) schedule (a variable number of responses must be emitted before a reinforcer is presented), or a variable interval schedule (VI, a variable period of time must elapse before an emitted response [or responses] will produce reinforcement); and 3) The efficacy of the conditioned reinforcer is a function of the efficacy of the primary reinforcer on which it is ultimately based.

Conditioned learning (i.e., conditioned reinforcement or conditioned avoidance) is operationally distinct from instructional learning. With instructional learning, the first person experience is replaced with instructions (e.g., subjects learn vicariously through direct observation, or by verbal, written, or some other form of symbolic communication). It is likely that behaviors learned by first hand experience in a conditioned avoidance process may be more firmly established than those learned vicariously by instruction. For example, consider the strength of control over behavior of the instructing a child "Don't drink that, its hot!" in comparison to a child's previous experience getting burned by drinking a steaming beverage, or the therapeutic challenge of eliminating a behaviorally conditioned phobia. In regard to drug abuse, the idea that knowledge obtained through instructional learning may not effectively control behavior is borne out. As in the case of the Drug Abuse Resistance Education (D.A.R.E™) program, data show that very substantial increases in knowledge about drugs of abuse are not accompanied by corresponding decreases in future experimentation with drugs.

A recent, well-controlled study gives support to the hypothesis that conditioned avoidance may be effective in preventing substance abuse. Johanson et al have demonstrated that a computer-generated delayed matching to sample task and a stimulus tracking task, can be used to establish a conditioned preference for one of two placebo capsules as a function of being paired with money reinforcement. In this study, volunteers were administered two differently colored capsules that the volunteers were told might contain two different drugs. Both capsules in fact contained only placebo. The subjects participated in matching to sample and tracking sessions after taking each of the capsules, and were told that the amount of money they could obtain for participation in the study would depend upon their performance of the tasks. In fact, the participants' performance was irrelevant, and the amount of money earned was greater following one capsule than the other. To obscure the fact that accuracy was unrelated to earnings, the tasks were designed to be sufficiently difficult and "ambiguous" as to prevent the subjects from readily determining the accuracy of their performance. When the participants were subsequently presented with the choice of self-administering one or the other of the capsules, 75% predominantly chose to self-administer the capsule associated with the high level of monetary reinforcement. This degree of control over choice behavior is similar to that reported for d-amphetamine, phenmetrazine, and alcohol. Therefore placebo capsules were able to control the same degree of choice as unconditioned drug reinforcers.

This demonstration of the control of choice behavior in the absence of pharmacological effects suggests that, in addition to their directly reinforcing effects, drugs may also function as conditioned reinforcers through their association with established reinforcers. Drug-taking often takes place in an environment in which social reinforcers are also available. As Johanson et al note, it is therefore likely that this association will result in the development of conditioned reinforcing effects that would add to the drug's unconditioned reinforcing effects. These conditioned reinforcing effects may be an important factor in the early phases of drug use. The present invention recognizes that since conditioned reinforcement may lead to drug-taking, conditioned avoidance may be used effectively to prevent drug abuse.

The approach of using of using conditioned avoidance in substance abuse prevention is poorly documented. The lack of prior research on the topic is probably due to the negative connotations and ethical concerns associated with aversive conditioning, which conjures images of shock therapy. Also, in its usual incarnation, avoidance conditioning would involve administering drugs under aversive conditions, a procedure which would be antithetical to its own purpose and highly unethical, to say the least. There is, however, a small literature on the related topic of substance abuse rehabilitation (i.e., smoking cessation). The techniques employed used either electric shock paired with each drag taken on a cigarette, or smoking itself as the aversive stimulus in a continuous, rapid-smoking procedure in which subjects were required to smoke rapidly until they were unable to continue. These techniques were initially highly effective in conditioning abstinence (initial success rates ranging from 32% to 100% were reported), however maintenance of cessation over extended periods of time was problematic (about 30% relapse at 3 months post treatment, and no difference from control conditions at 1 year post treatment). This failure to maintain abstinence may be due to an inability to provide booster sessions (and note that some subjects are treated for as few as 3 days), as to do so would be antithetical to the purpose of the procedure, i.e., to quit smoking. In considering the application of conditioned avoidance to prevention, it should be remembered that it is far easier to prevent substance use than extinguish it once it has been established.

Despite having the support of an extensive history spanning three-quarters of a century, the principles of operant psychology have seldom been brought to bear on the question of human substance abuse. Where attempts to apply these theories to human interventions have been attempted, however, the results have been extremely promising. For example, when behavioral principles were recently applied to the drug rehabilitation clinic (now referred to as "contingency management"), a >90% improvement in success rates at 24 weeks was observed in comparison to traditional therapies. The phenomenon of conditioned avoidance is particularly well-suited for used in substance abuse interventions as it is relatively easy to establish and highly resistant to extinction (it lasts a long-time without booster sessions). To our knowledge, prior to this invention, the behavioral principle of conditioned avoidance has not been applied to field of substance abuse prevention.

The potential for video games to influence the behavior of American youth is widely appreciated. An estimated 6 million arcade/action computer games were sold in January–October, 1996, with roughly half of those games going to end-users under the age of 20. One on-line computer game service (blizzard.net) reports 40,000 users a day, with users spending an average of 3 hours on-line at a time. So great is the perceived influence of video games that the United States Congress has held hearings on their content and labeling. In recognition of this influence, the United Kingdom's Health Education Authority has produced it's own multimedia drug educational game "D-Code" in September of '97, and the US Drug Enforcement Agency has placed the message "Winners don't do drugs" on the start-up screen of many video arcade games. Unfortunately, the effectiveness of this type of campaign is difficult to assess.

In our product survey, the drug effects modeled in entertainment-oriented games are typically entertaining and either without negative effects, or with negative effects (staggering, blurred vision, loss of "motor" control) incorporated into game play in such a way that they nonetheless might encourage drug or alcohol use. For example, in the recent release of the game "Redneck Rampage" drinking not only causes staggering, blurred vision, loss of "motor" control, and ultimately, retching (amusingly portrayed), drinking also improves the player's health status when he is suffering from injuries.

Although there are numerous educational computer software games on the market, those that deal with substance abuse do not incorporate the vast knowledge about the relationships that govern environmental control of behavior. One computer game engages a player with a "marijuana related situation" (e.g., "You are studying for tomorrow's big exam when friends come over and ask you to smoke some really good stuff with them."). The player is then given a list of options to choose from: (1) say no; (2) just try a little; (3) say yes, but only after the exam; and (4) say yes, and forget the exam. After the player selects one of the options, he or she receives feedback based on the selection, for example, "Too bad! You flunked your exam". The player is then subsequently presented with a new situation that presumably follows from the player's previous choices, for example the subsequent choices would include: (1) the player who abstained is once again invited by friends to smoke marijuana; (2) the player who smoked marijuana and flunked the exam is told, " . . . you have just gotten stoned, your friend suggests you go for a dip in the pool . . . ". As an aid to the player, a "responsibility meter" is ever present on the screen to inform the player how responsible their choices are deemed.

A second paper describes the development of what appears to be a program of similar design, "SMACK™," which focuses on the consequences of heroin use. In contrast to the Marijuana Action Maze, the developer of "SMACK™" reports that the computer-simulated situations are accurate portrayals of the drug culture, and accurately portray the consequences that stem from drug-use. However, a lack of preventative effect might be expected, as the game appears to unrealistically ignore the positive rewarding, euphorogenic effect of drugs. Furthermore, if the game players refuse taking the drugs, the game as described offers little educational or entertainment feedback in view of the positive choice taken by the player, for example, normally, refusing to spend time and money on drugs may allow the opportunity for the person to apply for and get an exciting job, or to save money and go on a date. This could paradoxically lead to conditioning a reinforcing effect of the drug, as the game could be more interesting when drug sampling leads to novel situations.

Simulations have been used in attempts to prevent substance abuse. Specifically, U.S. Pat. No. 3,916,534 describes a driving simulator that allows the user to test/practice his or her skills at controlling a simulated vehicle under various road and hazard conditions. These hazard conditions include settings modeling of the impairment of user by various levels of blood alcohol. In another example, to show high school students the fatal effects of drunken or drugged driving, participants wear "Fatal Vision" goggles that distort perception and make the wearer disoriented, uncoordinated, and woozy. They then drive a cart through an obstacle course of stuffed animals.

The behavioral principles the above games and any other games like them employ are distinctly different from the principle of conditioned avoidance. While such simulations rely on conditioned learning (learning through experience), the behavioral principal they employ to encourage drug abstinence is differential reinforcement. "Differential reinforcement" refers to the fact that reward (e.g., successfully completing the simulation objectives, such as completing a simulated driving course in a good time) is more readily obtained in the "drug free" than in the "intoxicated" simulation. Thus, with the differential reinforcement procedure, a preference is established for one condition relative to a second condition by providing a high-density of positive reinforcement (lots of rewards) in the first condition ("drug-free") and a low density of positive reinforcement (few rewards) or no positive reinforcement, (termed "extinction" or "frustrative non-reward") in the second condition (intoxicated). This procedure differs operationally from conditioned avoidance, in which negative reinforcement is used to condition active avoidance of a given situation. The following example illustrates this distinction:

A) Differential Reinforcement and Frustrative Non-Reward.
A user is evaluating computer files backup software. The user installs the product "Rapid Backup A" on his computer, and uses it throughout the day. The user finds that the program rapidly and accurately backs up his files when he activates the backup feature. The next day, the user installs the product "Rapid Backup B" on his computer, and uses it throughout the day. The user finds that the program often rapidly and accurately backs up his files when he activates the backup feature, but occasionally when he activates the backup feature there is a delay, after which he is presented with the message "Backup Failed, Re-try?". (This would be "frustrative non-reward" of his backup attempt) The likely outcome is that the user will find "Rapid Backup B" frustrating, and prefer "Rapid Backup A" to "Rapid Backup B," but still might be glad to use "Rapid Backup B" if"Rapid Backup A" were not available to him.

B) Conditioned Avoidance. A user is evaluating computer files backup software. The user installs the product "Rapid Backup C" on his computer, and uses it throughout the day. The user finds that the program usually rapidly and accurately backs up his files when he activates the backup feature, but occasionally when he activates the backup feature he is presented with the message "Backup Failed, All Files Created Since Last Backup Have Been Deleted". (This would pair an "aversive stimulus" with the previously neutral stimulus of "Rapid Backup C," and thereby establish "conditioned avoidance" of "Rapid Backup C.") The likely outcome is that the user will find "Rapid Backup C" highly aversive, delete the program "Rapid Backup C" from his computer and inform his colleagues that they should do likewise, and avoid, for years to come, any other software produced by the company that released "Rapid Backup C."

It will be it appreciated that, as described above, 1) the more frequently the aversive failure is experienced, the more firmly the conditioned avoidance will be established. 2) If the aversive failure is experienced only intermittently (e.g., on a VR or VI schedule), the conditioned avoidance will be much longer lasting. That is, if failure was experienced every time, and on a subsequent exposure no failure was experienced, the user might trust that the problem had been fixed. If failure was initially experienced only intermittently, and on a subsequent exposure no failure was experienced, the user might still fear that the problem had not been fixed, and continue to avoid the software. 3) The conditioned aversion will be greater if critical rather than trivial files were lost (the conditioned aversion was established on powerful primary reinforcers).

To date, substance abuse prevention efforts have not pursued application of the operant psychology principles of conditioned avoidance and stimulus generalization, and the theories derived from the work of substance abuse prevention researchers in the field of social psychology to the medium of computer or console-based video games.

In view of the foregoing, it is the general object of the present invention to provide a computer game method and apparatus that uses conditioned avoidance and stimulus generalization for the purpose of preventing players of the game from abusing drugs.

It is another object of the present invention to provide a game that allows players to experience the probable outcomes of substance abuse in a virtual game environment.

It is a further object of the present invention to provide players of the computer game of the invention with knowledge about the danger of substance abuse to teach other players about such dangers in a virtual game environment.

It is yet another object of the present invention to provide a game such that all game players must cooperation to obtain the game's objectives.

It is also an object of the invention to pair an aversive stimulus with certain kinds of choices made by a same player in the virtual game environment.

SUMMARY OF THE INVENTION

The present invention applies to the medium of computer and console-based video games the operant psychology principles of differential reinforcement, conditioned avoidance and stimulus generalization, as well as several proven theories derived from the work of substance abuse prevention researchers in the field of social psychology. Generally, embodiments of the invention may be launched on computer or console-game platforms, in game formats including: action/adventure, sports, various games of skill ("shooter" games, driving or flight simulators, etc.), and role-playing games. The preferred embodiment of the invention is an Internet based, multi-user role-playing game. The principal advantage of the invention is that it exposes users to a research based, theory driven substance abuse intervention in a highly accepted and engrossing media, video games.

The arrival of the Internet has made possible a new, highly social genre of computer-video games, the "competitive/cooperative, virtual community role-playing game." In this type of game thousands to literally unlimited numbers of players can interact in a common "virtual" environment. In role-playing games (RPG's), players assume the personas of fictitious characters that live and act within the environment created by the game's designer. These personas are termed player-characters (or P-Cs), and are distinguished from non-player-characters (NP-Cs) that are generated by the computer and are elements of the game itself. Human players put themselves in their character's place, and react to the other characters, whether they are human or computer controlled, and the "world" around them. Each player-character has a set of characteristics or "statistics" or "stats" which are usually numbers (but could be any descriptive term) which are used by the program to define the character's ability to do just about anything within the game. For example, a "Strength" stat might determine a character's ability to lift a heavy object, or an "Intelligence" stat might determine the time it would take a character to learn a foreign language. Player-characters usually also have a list of "skills" e.g., the ability to program a computer, or to speak a foreign language. In a role-playing video game, a player controls the actions of his "avatar", a 2-D or 3-D representation of the player's character within the game, visible to all the other players. When a player has his character attempt to do something in the game an algorithm uses the characters stats and/or skills list to determine if the character is successful in the attempt. Alternatively, some of a P-C's abilities to do things within the game may depend upon the player's skill in utilizing the keyboard, mouse, joystick, or other devices to interact with the video display.

Typically, groups of 3–8 players (and therefore P-Cs) will play together at once, and their group of P-Cs, will set out on missions and quests that can only be fulfilled by the cooperative efforts of the group as a whole. It is, however, contemplated that the present invention may also be played by one human player-character and other non-player-characters controlled by the computer. A number of groups may band together as a "community", and work independently towards common communal goals (e.g., overthrow of a hostile government, etc.). Through game play, players develop their character's (group's, community's, etc.) skills, amass fortunes, and accumulate power. Similarly, mistakes (such as drug use) can have long lasting effects that the player's character (group, etc.) will have to contend with. A character that has not been killed during the session is saved at the end of each gaming session, and thus can survive and grow over months or years of game play. Normally, a character that dies within the game is permanently lost, and that player must start developing a new character from scratch. Thus, players of such games often become quite protective of their "well developed" characters, and actively avoid situations that could have long-term negative consequences for them.

The present invention uses computer simulated environments incorporating situations where through a player's player-character, a player can experience and participate in, differential reinforcement, conditioned avoidance, conditioned reinforcement, and generalization responses. In other words, the advent of this new genre of video game allows the opportunity to incorporate into such games a wide range of effective components of drug abuse prevention efforts. The video game of the preferred embodiment of the invention includes the following example:

> "Mike's character Astroman is meeting his friends to invite them on a dangerous but profitable quest. He joins them in a tavern and consumes large quantities of beer as he spins his yarn. After planning their strategy, they all leave together in Astroman's hovercraft. Amusingly (at first), Mike finds that as Astroman is drunk, his (Mike/Astroman's) driving skills are impaired. Driving out of control, the hovercraft crashes and Astroman and his companions do not survive. Mike is crestfallen, having developed the character of Astroman over a period of months. Worse yet, Mike will soon hear from his gaming companions Jim and Michelle, who may have had even more time invested in their characters, and did not notice how much Mike had Astroman drink while in the tavern . . . "

Years after Mike has forgotten the drug education lessons he learned in school, he may yet be influenced by Astroman's experience as he considers an inebriated drive home on New Year's Eve. By accurately modeling the established effects of drugs within our game (without "educational exaggeration"), we expect to reach individuals who readily dismiss other drug abuse resistance campaigns that all too often may appear hysterical and inaccurate (e.g., the movie "Reefer Madness"), uninformative (and thus, inaccurately perceived as baseless e.g., "Just Say No"), or just too dry and detached from experience to impress the population at risk (didactic classroom lectures). Through the "total immersion" experience of the virtual community role-playing game, players will learn not only by the consequences of their own actions, but also through discussions and peer pressure generated by experienced players, who want their plant (city, colony, etc.) to profit and grow, rather than endure the costs of absenteeism and decreased worker productivity.

The video game that is the present invention realistically portrays drug use either directly (if the player-character chooses to use drugs within the game) or indirectly (through another player-character, whether human or computer controlled, using drugs and the player witnessing the outcome). Each player can use knowledge about drug effects to accomplish game objectives (e.g., save the life of the ambassador's daughter when she overdoses). Vehicles for obtaining this information are readily available within the game. For instance, the present invention includes a display available for depicting a character's vital signs, and authority figures (physicians, police officers, university professors, etc.) from which accurate information and good advice can always be obtained. Thus, the player learns about the effects of drug use through self-initiated inquiry and "virtual experience" with drugs, thereby permitting the use of conditioned avoidance to influence the player's attitudes and future behavior.

Our invention employs the behavioral principle of conditioned avoidance by attaching negative consequences to the abuse of drugs and alcohol simulated within the game. The game optimizes the effectiveness of the conditioned avoidance procedure by basing the avoidance of drugs on a highly motivating primary reinforcer (protection of one's P-C) and maximizes opportunities to experience the contingencies embedded in the game by encouraging extended game play. Note that in contrast to classroom instruction, or even classroom theatrical role-playing exercises, players will experience negative consequences of (simulated) drug abuse. The accurately portrayed, negative consequences of drug abuse will adversely affect their game character's ability to thrive and meet his or her life objectives, just as they do in real life. The game of the present invention also accurately portrays the negative consequences that drug abuse by one player-character has on other player-characters' own life objectives, even if the other player-characters' are not abusing drugs. By accurately portraying the effects of drugs and alcohol, without exaggeration, the stimuli of the drug (e.g., "cocaine") as modeled in the game will more closely resemble the stimuli of the drug (cocaine) in the real world. Accurate modeling of drug effects will also enhance the likelihood of stimulus generalization (from game "cocaine" to real cocaine) and the conditioned avoidance of cocaine in the real world. In simpler terms, if players can see that what they already know to be true of drugs is accurately portrayed in the game, they will be more likely to believe the lessons they learn de novo within the game and apply them to real life. Since the negative consequences of substance abuse are often not experienced with each and every episode of drug use, these negative consequences will be presented in a scientifically accurate, probablistic fashion. This will have the effect of presenting the aversive stimulus pairing with virtual drug use on a VR or VI schedule. According to operant theory this should increase the resistance of the conditioned avoidance to extinction (prolong the longitudinal effectiveness of the intervention).

The computer game of the invention will also incorporate the following intervention strategies:

1) The same invention will deliver developmentally appropriate information about drugs. Children and adolescents are more interested in concrete information on the here and now experience than they are in information about possible effects in the distant future. The game is designed to allow them to immediately experience in the virtual environment of the game invention the probable outcomes of substance abuse.

2) The game invention develops players' social resistance skills. The game invention incorporates scenarios in which player characters have the opportunity to resist social pressures to use drugs. Rewards are programmed into the game for those who resist, or help other players resist the temptation to experiment with drugs (differential reinforcement). Aversive consequences are programmed into the game for those who do not resist, or help other players to resist, the temptation to experiment with drugs (conditioned avoidance). Also, the anonymity offered by the fact that the game is played over the Internet facilitates the ability to resist peer pressure to experiment with drugs within the game, giving players the opportunity to practice resistance skills.

3) The game invention promotes discussions between the players about the consequences of substance abuse. Player-characters can take advantage of interactive teaching opportunities through the use of player-characters clearly identified as having authoritative knowledge on the effects of drugs and how characters may be affected by them. These player-character authorities may be controlled by artificial intelligence or by trained, online "mentors."

4) The game invention provides adequate coverage and sufficient follow up. The effectiveness of interventions in preventing subsequent substance abuse increases with increased exposure to the key components of the intervention, and decays over time since the last exposure to intervention. Many drug abuse prevention programs offer 10 sessions the first year, followed up by 5 sessions the following year. The present invention uniquely places intervention efforts in an exciting and engrossing computer game. The game invention results in players spending more hours interacting with substance abuse interventions of the game invention in 1–2 weeks than they would spend in an entire traditional drug abuse prevention curriculum. The present invention achieves long term follow up by maintaining player interest in the game with periodic updates, as well as by disseminating the drug effect library to other developers wishing to use it in the design of their games.

5) The present invention provides a means for continually evaluating the effectiveness of its intervention strategies by identifying the key components of the invention's intervention strategies that make it effective and exploiting these components in future revisions of the same invention. The bidirectional communication interface to be used in the preferred embodiment of the game will be used to collect statistical data on the effectiveness of the drug abuse resistance training embedded in the game.

6) The game invention encourages formation of peer groups that regularly play the game together by setting objectives that can only be accomplished by a team of players. Furthermore, the game invention encourages players with knowledge about the dangers of substance abuse to teach those players in their peer group who have not yet learned, as avoidance of drug abuse by all members of the peer group will enhance every peer group member's chances of obtaining the game objectives.

7) The game invention also identifies correlates of substance abuse that are likely to play causative roles in either facilitating or preventing substance abuse. The game emphasizes the incompatibility of substance abuse with the achievement of life plans and the negative psychological and social consequences of drug use within the game.

DETAILED DESCRIPTION OF THE PREFERRED EMBODIMENT OF THE INVENTION

The present invention provides a game that serves as a vehicle for implementation of theory-based substance abuse prevention strategies. These strategies include: conditioned avoidance, stimulus generalization, conditioned reinforcement, differential reinforcement, the use of variable reinforcement schedules, social resistance skills training, delivery of developmentally appropriate information, interactive teaching, peer group involvement in teaching, influencing attitudes associated with drug-abstinence, and a facility for evaluation and revision of the game once it is launched to enhance its effectiveness as an intervention.

The preferred embodiment of this invention is a multi-user role-playing game design for use over the Internet or other networked gameplay. In another embodiment, the game would be designed for single users, and would use "artificially intelligent" computer controlled characters to replace the role of the human players in the multi-user version.

Game Setting

In the preferred embodiment, the game invention is set in a current day, science fiction environment in which a conspiracy of world governments and mega-corporations have been secretly exploring and colonizing space ever since the technology to do so was first obtained from space-aliens in the early half of the 20th-century. A player starts the game by assuming the role of a player-character in the virtual environment of the invention as an individual who has been secretly recruited to become part of the space colonization program. A wide variety of career paths (military, merchant, political, pirate etc.) are open to the player-characters and may be chosen by each player. Play begins with training in the basic skills needed to survive in space. Each player must make choices about how to develop their player-character's abilities to ensure both their own success as well specializing to insure the success of any group the player-character might belong to (such character groups result as a function of the peer clusters that form to play the game together). Player-charters must select their own blend of schoolwork, organizational affiliations, organized social activities, and independent activities, etc., based on the knowledge, contacts, social skills, specialized knowledge, etc. they want and select to acquire. The skill sets they acquire will determine their likelihood of success at the various endeavors they subsequently choose to undertake (from joining a high tech clandestine organization to paying the grocery bill). From the beginning, this approach encourages the player to consider choices that will affect them in both the short term and the long term. Players become responsible for the nature and quality of life their player-characters will experience throughout the game, and these choices provided by the game invention relate directly to the kinds of choices players encounter in everyday life.

Game Interface

The player's game interface consists of three elements: a Viewscreen, a Communications Screen, and a Status Screen displayed on a monitor. The Player will have some customization ability available. For example, the ability to deactivate the Status while enlarging the Viewscreen.

Viewscreen

The Viewscreen is the largest portion of the screen: this is the "world" the player-characters exist in. In the preferred embodiment, the viewscreen depicts the world from the first person perspective. In this perspective, the viewscreen displays the "world" as it would be viewed from a player-character's eyes. The graphic depiction of the player-character, or avatar, is not displayed on the player's own screen, although it is visible to the other players when they are looking in its direction. A player of the game invention utilizes the keyboard, mouse, or any other of a plurality of input devices to direct his avatar's movement through the virtual environment. The keyboard or any other of a plurality of input devices can also be used to look or glance up, down, left, or right, without moving the player's character within the virtual environment. The display allows optical distortion effects, including zooms, rotations, folds, compression, stretching, and lens effects. Lens effects are where a portion of the display is distorted as if a transparent, optical lens was between the viewer and some portion of the display. The lens effects allow for these virtual lens to be colored and dynamic. When (according to the player's skills and actions) the game determines that the player-character notices something out of place or otherwise has his attention drawn to a certain item, the interface will highlight that item or area as appropriate to call attention to it. Most of a player-character's interactions with the environment will be controlled by two steps: 1) A general-purpose cursor (depicted by an arrow) is positioned over the object to be interacted with and a response (such as a mouse click) is performed to activate selection of the object; and 2) An action is then selected from a menu of actions the character may attempt to perform on the object. Alternatively, the player may first select an action to be performed from a menu of available actions (such as "fire weapon"), then select the objects the player-character will attempt to perform the action upon (in this example, the objects to be fired upon). The graphic for the pointer reflects the action that will be performed if an object is acted upon. When both of steps have been performed, success or failure of the attempt will be determined by the program using an algorithm based on the player-characters' skills and attributes (as discussed in detail below). Examples of actions that may be performed include:

Movement: Clicking on a spot auto-moves the character to that point. Movement of the cursor over items highlights them.

Take/put: The avatar will pick up and hold items selected by clicking on them, while clicking again puts it down. If an item is too far away, the avatar automatically moves to an appropriate location.

Operate: Clicking on selected item functions to activate single function or toggles dual function items (on/off). Clicking on a multifunctional item opens a pop-up menu of available functions.

Fire Weapon: Movement of the cursor over objects that can be targeted highlights them, and a number representing the probability that a shot fired at the object would hit the object is displayed over the object. Clicking fires the currently held weapon at the selected target (if no weapons are currently held, throws a punch).

Command line (dialogue box): May be used for a single command that does not appear in the available actions menu. Used where the game design calls for player-characters to exert effort to identify and select actions to perform that may be appropriate to their present situation. For example, if a player found his character locked in a windowless room containing only a table, a chair, and large empty desk, the player might be required to type "move desk" in the command line in order to reveal a trap door through which his character can escape. The alternative of placing the command "move" in a drop-down menu that appears when the cursor is placed over the desk would remove the puzzle aspect of this game scenario.

In another embodiment of the invention, the view of the player-character is a tactical one, where their avatar Figure is shown in their immediate environment. This screen shows the avatar from a ¾ view and in high-resolution. What the player sees is limited to the player-character's line of sight. Animate objects such as other player-characters are not presented on the players screen when they are out of the player-characters view. Animate objects and areas the player-character has previously viewed are displayed to the player, but with a gray filter overlay to indicate that the player-character can not currently see in that area. The player may zoom the display in and out.

Communications Screen

The communications screen will consist of three sections as described immediately below:

The Communication Input Line is the text-editor line for all player-character communication. The player can type no more at a time than will fit in the box that appears on the Viewscreen. To send a message, the player must select the "send-in-character" or "send-out-of-character" button. When a message is sent "in character," the Viewscreen graphical display indicates the player-character that speaks the line. In addition, the system allows for a player-character to "whisper" to another player-character privately (location restrictions apply) where only the player-character whispered to receives the message, or to shout to all player-characters within hearing range. All "audible" player-character communication is echoed to and stored in the Messages Center as discussed below so those Players who want to can "scroll back" to read previous communication.

The Game Communication Line is the display for all "in-character" communication audible to the character, as well as any "in game" communication generated by the game itself.

The Player Communication Line is the display for all "out-of-character" communication. This system allows for Players to exchange non-game messages and ideas without disrupting the flow and the immersion in the actual game invention, such as "Where are we meeting for dinner after the game?" This Line also acts as a "Special Commands Line" for Online play, allowing the player to, for example, send a [SEARCH] for a certain player or player-character online or to turn off certain types of Communication.

In addition, the Demeanor Indicator allows a player to select their player-character's demeanor. The conveyance of emotion is very important to role-playing, and this feature allows a player to control the font his other player-character is speaking with, thus clueing other player-characters (and their players) as to the mood of the player-character that is speaking.

Status Screen

The character screen displays basic character information and links to other, more detailed character information screens. By default, it will bring up the statistics page of the character, though if the character exits the screen in another view, it will come back to that view when selected again. Buttons along the bottom of the screen allow the player to jump to the different areas of character information. If (for some reason), all of the selected information does not fit into the multi-function display, it will become scrollable (with a scroll bar appearing). The different screens are selected by pressing the appropriately labeled buttons along the bottom of the character screen. The character mannequin to the left of the screen should realistically depict the character as it is equipped and clothed, as well as items carried (if visible). The various screens and areas of character information available are:

1. A statistics screen displays the character's attributes in the multi-function display area as discussed in more detail below.
2. A skills screen displays the skills the character has acquired and her/his degree of mastery in each skill.
3. An inventory screen displays items in the player-character's personal inventory, as well as allowing (when the player-character is in the appropriate location) the player-character to trade items with another player-character or to move items between the player-character and some holding area (such as the player-character's ship, fortress, deposit box, etc.). The inventory screen also allows the player-character to open/close/use items in her or his inventory, which contain other items (such as a briefcase or satchel), and move items into and out of the opened/selected item. The inventory screen also allows the player to equip with items and/or clothing and carry items in particular locations on the character mannequin to the left. The mannequin graphic updates as the player-character moves or adds/removes items from the mannequin.
4. A personal log both allows the player to make notes (automatically adding a date and time stamp to the notation) and automatically makes notes of significant events (such as getting a mission, completing a mission, etc.). It displays items in reverse order (i.e. most recent first, oldest last), and permits text search. The player can delete items from this log, but it does not otherwise delete records.
5. A missions screen displays current mission information. If the player-character has more than one mission currently, a list of current missions is displayed, and upon selection, information about a select mission is displayed.
6. A holdings feature calls up a list the player-character's current properties. As each item is selected, a graphic of the item is displayed, along with the item's location, and current status (as far as the player is aware). Status reflects both condition (good, bad, damaged, etc.) as well as any financial considerations (such as 'Rent due in 2 days', 'Mortgage: 25,000CR').
7. A back/exit feature takes the player back to the previous screen.

Game Objectives

The game invention's objectives fall into one of three general categories. The first category is for a player-character or group of player-characters to have positive impact on the (game) universe in accordance with a player-character's design and intent. The design of the game environment of the invention is the type and referred to as a "persistent world," or one in which characters actions change the environment permanently—or at least until another character changes the environment again. A wide range of possibilities exist, with examples ranging from building a monument to oneself in the town square, to building a new colony on a recently discovered planet, to helping to overthrow a hostile government in a neighboring sector. Objectives may be short, medium, or long-term, and may require anywhere from a single player (build a monument) to the entire community of game players (as in the case of waging a war) to accomplish.

The second general category of game objectives is the completion of specific missions. All P-Cs will go on missions at one time or another. Some missions will be computer-generated, and the players themselves will generate some missions. In either case, within the game reality, all missions will appear to be generated by the player-characters in pursuit of their own goals. A mission may consist of one or more objectives, and the player-characters will be promised some form of reward for satisfying those objectives (some may even give partial pay for partial completion of the mission). The players must design and implement their own plans to complete a mission. While the types of missions generated by the players will not be limited, the types of missions to be generated by the game will include the following:

1. Retrieve an item: the mission specifications call for a particular, specific item to be found and brought to a certain location or individual.
2. Escort an item: the mission requires the player-character to escort and protect a particular, specific item from one location to another. The player-character does not necessarily take possession of the item (though they may do so in case of emergency).
3. Transport an item: the mission requires the player-character to take possession of a particular, specific item from a location or individual and transport it to another location or individual.
4. Retrieve information: the mission requires the player-character locate specific information (usually on a computer), copy that information, and bring it can to a certain location or individual.
5. Destroy information: the mission requires the player-character to locate specific information, and destroy or delete that information.
6. Plant information: the mission requires the player-character to go to a specific location or computer, and place the given information there without leaving traces.
7. Capture an individual: the mission requires the player-character to find a specific person, capture that person, and bring them to a certain location or individual.
8. Transport cargo: is similar to transport an item described below, only numerous items are entailed.
9. Destroy an item: the mission requires the player-character to locate a specific and particular item, and destroy that item.
10. Destroy cargo: is similar to destroy an item described above, only numerous items are entailed.
11. Go to location: the mission requires the player-character to go to a specific location, and usually await further orders.
12. Go to individual: the mission requires the player-character to find a specific player-character, and go talk to them. Usually, the mission also requires the character to take whatever mission at individual gives them.
13. Protect individual: the mission requires the player-character to protect a specific individual from harm for a set period of time, or until is certain event.
14. Escort individual: the mission requires the player-character to travel with (and usually present escape or harm) in individual from one location to another.
15. Kill individual: the mission requires the player-character assassin make a specific individual, usually within a set amount of time.
16. Prevent mission: the mission requires the player-character prevent another player-character from completing one of the above missions. In many cases, the player-character will not know the other player-characters identity.

The third general category of game objectives is to improve one's player-character's standing and influence within the game, typically through the player-character's improving their attributes and skills, accumulating wealth and resources, acquiring status through good works, and earning rank through achievement.

Character Definition and Task Resolution

A key component of the game invention is the realistic representation of the effects of substance abuse. Drugs of abuse act directly to cause highly specific alterations to the normal functioning of the brain and other body organ systems. The invention relies upon a game design platform that defines and assigns a level of functionality to a variety of character attributes that model the functionality of the brain and body systems of real human beings. The intervention utilizes the game platform to model the effects of drug use on performance in the game by identifying the attributes on which the drugs are known to have direct effects, and modifying them accordingly.

In the preferred embodiment of the invention, the character definition rules are derived from the Fuzion™ System, developed by the Fuzion Group™. The choice to use Fuzion™ is similar to choosing Windows98™ as our operating platform. The present invention could use any number of different game platforms that use a similar rule set based on similar principles.

Primary Characteristics

Characteristics (or Attributes or Stats) are numbers that describe a character's abilities as compared to everything else in the universe. Attributes are generally rated from 1 to 10, with higher numbers correlated with a greater probability of success in completing tasks relying on exercise of these attributes. The descriptions of these characteristics are grouped as follows:

Physical Group

Strength [STR]

STR refers to muscle mass and how effective it is for exerting force. The higher the number assigned to a player-character's strength, the more the player-character can lift, drag, etc., and the more forceful blows from the fist or other body parts are.

Constitution [CON]

CON refers to a player-character's relative healthiness and resilience in the face of poison and disease, and also refers to resistance to being dazed in combat situations.

Body [BODY]

Body refers to a player-character's resistance to dying or being knocked unconscious. Secondly, it also refers to a measure of a payer-character's size and weight, though this can be highly modified or even ignored. A relatively small person can, for example, have a decent to high BODY score, in which case their toughness and "will to live" is part of the measure.

Mental Group

Intelligence [INT]

INT is a measure of a character's perceptiveness, knowledge, problem-solving skills, and deductive reasoning, and aptitude.

Confidence [CONF]

CONF is a measure of a player-character's internal perceptions of their ability, which influences their courage and willingness to take risks and their ability to resist fear and other emotion-altering situations. Low scores (temporary or permanent) can alter almost any Action, while high scores (again, temporary or permanent) can affect Actions as well.

Charisma [CHA]

CHA is a measure of a player-character's ability to positively influence others around them. CHA influences primarily interactions with NP-Cs. When CONF is altered unnaturally (i.e., through the use of drugs) the player-character will perceive changes in this attribute that are not necessarily real. In particular, a drug may cause a dramatic increase in CON, which will in fact lower CHA but will cause the player-character to see an increase in CHA.

Combat Group

Reflexes [REF]

REF refers to the "To Hit" attribute of the game, which is used in determining whether a player-character successfully hits a target aimed at. REF is also used to determine the outcome of attempts to use "skills" dealing with hand-eye coordination, response time, and accuracy.

Dexterity [DEX]

DEX refers to whether a character successfully defends against an attack. DEX also influences skills dealing with balance, agility, and athleticism.

Technique [TECH]

TECH refers to the "Good With Hands" attribute, similar to "fine motor skills", used in skills dealing with manual dexterity and the use of tools.

The MOVEMENT group featured in most FUZION™ games is removed from the game invention for simplicity's sake; the Derived Characteristics it feeds into are based upon Physical and Combat attributes instead. This means that a Character's abilities to Run, Sprint, Leap, and Swim are derived from their PHYSICAL and COMBAT attributes.

With regard to Primary Attributes, whenever a game effect is listed as adding to or subtracting from a Group, the modifier is applied equally to each Stat in the group. For example, a −2 PHY would mean that a penalty of −2 is applied to Strength, Constitution, and Body. This, in turn, will directly affect all Derived Characteristics that are associated with these Stats.

Derived Characteristics

Derived characteristics have game functions similar to those of the primary characteristics. As a class, they differ from the primary characteristics in only one way. The numerical value of the derived characteristic is a function of the values assigned to the primary characteristics. The derived characteristics functions and the algorithms used to assign their numerical values based on the Primary Characteristics are described as follows:

Hit Points

Hit points are a measure of what it takes to kill a Character. When a Character reaches a HIT POINTS value equal to −(BODY*2), they are irrevocably dead. A player-character begins with a HIT POINTS value of [BODY*5].

Stun Points

Stun points refer to a measure of what it takes to knock a character unconscious. When a player-character reaches a Stun Points value of 0, they are unconscious. Negative values mean longer recovery times. A player-character begins with a [STUN POINTS] value of [BODY*5].

Threshold [THRESH]

THRESH is a measure of what it takes for a player-character to be incapacitated by a lethal attack in one blow. If ever a Killing Damage attack does more HIT POINTS of damage (in one shot) to a player-character than their THRESH value, that player-character is immediately brought to 0 STUN POINTS and is Dazed (explained below under Task/Combat Resolution). A player-character begins with a THRESH value of [CON+BODY+CONF].

Recovery [REC]

REC refers to a measure of how quickly a player-character recovers from damage and other adverse conditions. Player-characters regain their ENDURANCE and STUN POINTS (whenever they take a Recovery Action or at the end of a turn, the latter happening automatically) at a rate of their RECOVERY value. The RECOVERY characteristic also influences regaining HIT POINTS, though this takes much longer and depends on the environment and medial attention required. A player-character begins with a REC value of [STR+CON].

Stun Defense [SD]

SD is a measure of how "thick-skinned" a player character is, i.e., how well they can take damage done to them from non-lethal sources. If ever a stunning damage attack strikes a player-character, their SD is subtracted before anything is deducted from HIT POINTS or STUN POINTS. A player-character begins with a SD value of [CON*2].

Run

Run is a measure of the distance (in meters) that a player-character can cover in a round of action and still maintain their normal levels of performance. A player-character can cover half this distance (round up) and still take an Action. A player-character begins with a RUN value of [{(STR+REF+DEX)/3}*2].

Sprint

Sprint refers to a measure of the distance (in meters) a player-character can cover in a round if moving at a "full bore, all out" pace. A player-character moving at this rate can take no other action and is at −5 to their defense values and any skill checks they may need to make. A player-character begins with a SPRINT value of [RUN*1.5].

Leap

Leap is a measure of the distance (in meters) a player-character can leap horizontally, assuming a running start of at least 2 meters prior to the jump. A player-character may jump upwards up to ½ half this value (round down) with the same running start. A player-character begins with a LEAP value of [(STR+DEX)/2].

Endurance [END]

END refers to how much "energy" a player-character has to expend without feeling profound and damaging fatigue. A player-character expends END at the rate of 1 for every 1 point of STR they utilize in a given Round. They expend 1 END for every 3 meters they RUN, or every 1 meter they SPRINT, calculated per Round. For every HIT POINT that a player-character is missing, they are down 1 END until that HIT POINT is recovered. When a player-character runs out of Endurance, he or she uses up 1d6 of STUN POINTS for every 1 END they try to spend. For every Hit point a Character suffers from this process, they suffer a −2 to their RUN, SPRINT, SWIM, LEAP, and STR player-characteristics until they have healed that damage. A player-character begins with an END value of [CON*5]

Skills

Like characteristics, Skills have numbers (Ratings) that describe a character's ability to perform as compared to everything else in the universe. Skills differ from attributes in that they may be acquired and/or improved upon through training that the character can obtain within the game, in contrast to attributes which are more of a description of the fundamental capacities of the individual character. The proficiency with which a character can exercise a skill is a function of the character's training in that skill (represented by their Skill Rating), and an associated attribute (or combination of attributes) that the skill relies upon. For example, a character's ability to successfully traverse a tight rope would rely on the character's skill rating in athletics as well as the character's current dexterity. The following is a description of the skills. The attributes they rely upon are noted in braces { }. Whenever an attribute group is listed rather than a single attribute, the average of all associate Stats is used (round up from 0.5). For example, if a situation or Derived Characteristic calls for the use of the PHY (Physical Group) Value rather than, say, just STR (Strength), the average value of all three Stats in the PHY is used. Thus, if a Character has a STR of 5, a CON of 4, and a BODY of 6, their PHY =5. If a Character has an INT of 7, a CONF (Confidence) of 4, and a CHA (Charisma) of 2, their MEN (Mental Group)=4.333-, or 4. Whenever more than one attribute is listed rather than a single attribute, any of the listed attributes or an average of any combination of the listed attributes may be selected by the facilitator for use in combination with this skill rating in determining the outcome of task resolution. For further discussion, see the discussion in "athletics" and "Task Resolution" below.

The athletics skill group {PHY, DEX, CON, END} represents the overall athletic inclinations (or lack thereof) of any character. Having a good score in this represents that the character has some natural gift or general experience with physical pursuits. These include (but are by no means restricted to)—Climbing, Throwing (non-combat), Running, Swimming, Jumping, Low-Crawling, and Gymnastics.

The Blocking {DEX, END}skill is the "other side" of Hand to Hand combat training; this skill represents someone's ability to avoid blows in unarmed and melee combat (whether it is through formal martial arts training or simply learning how to duck). Everyone is considered to have at least a 0 in this (there are no lack of proficiency penalties).

Bribery {CHA, CONF} represents a character who has the skill to bribe someone, including how to approach another character, and how much to offer. This skill is only useful against Non-Player Characters.

Bugging {INT, TECH} represents a character's ability to properly implant and operate listening, visual, or other sensing devices ("bugs."). One-half the rating from this skill (round down) may be added to any concealment check where "bugs" are being searched for.

Chemistry {INT, TECH} represents a character's theoretical and practical knowledge in the field of Chemistry. Creative uses might include analyzing alien substances or figuring out the composition of a strange atmosphere.

Computers {INT} represent a character's ability to operate and program computers, including cracking passwords, searching data networks for information, and programming specialized systems.

Concealment {INT} represents a skill used in hiding things from sight or in searching for things that have been concealed by others.

Criminology {INT} is a knowledge of how to look for clues, dust for fingerprints, examine evidence, perform ballistic tests, examine records, search through files, and so on. This skill also entails basic Forensics (although Medicine is also helpful).

Cryptography {INT} represents the ability to solve ciphers and to encrypt or decode messages. This skill is also useful for analyzing completely alien script to discern the use of some machine or otherwise determine what a sign might say (such as "Don't set off this Ultimate Bomb of Doom!").

Deduction {INT} is the art of taking several facts and drawing a non-obvious conclusion.

Demolitions {TECH} is the ability to properly use, handle, set, and defuse explosives. Very helpful if you are dealing with an Ultimate Bomb of Doom (see Cryptography).

Dodging {DEX} is a skill that represents a character's overall training and experience in avoiding missiles shot or hurled at them. All characters have a minimum stat of at least a 0 in this skill (no non-proficiency penalties).

Engineering {INT,TECH} is the "Techie" skill of choice, dealing with ship systems, electronics, power plants, and pretty much anything else you would expect a top-notch engineer in a Sci-Fi setting to be able to operate or (more importantly) fix.

First Aid {TECH} is the basic skill of preventing a character from bleeding to death or otherwise suffering further from wounds.

Hand to Hand {REF} is the skill used to fight open (bare) handed in combat. This can be anything from a formal martial art (such as jiu-jitsu or karate ) to dirty street brawling.

Heavy Weapons {DEX} is the skill used when dealing with weapons larger than an assault rifle. Such weapons include flame-throwers, rocket launchers, heavy machine guns, vehicle-mount lasers, and anything else that takes both hands and is better fired from a tripod or the shoulder.

Leadership {CONF, CHA} represents a character's ability to influence people, especially in a stressful situation or where management is needed over persuasion. It is only useful in situations where NP-Cs are involved (as using it "against" P-Cs would be counterproductive to role-playing).

Linguistics {INT} represents an additional language known by the character. More importantly, it represents the ability to make some sense out of communication with otherwise unknown languages, such as alien tongues or ancient dialects.

Lockpicking {TECH} represents the classic ability to open that which someone wanted you to leave closed.

Mechanics {TECH} is the skill with mechanical devices and the knowledge of how to repair, replace, and build them. This is a good complimentary Skill for Engineering, as it deals more with the hard, working parts of machines.

Medicine {INT} is a combination of both practical and theoretical knowledge in the field of Medicine. Useful for treating injuries and diseases, as well as understanding the biology and anatomy of people.

Melee {REF} represents formalized training or simple experience with whacking people with items of destruction, such as swords, clubs, etc.

Navigation {INT} represents a character's ability to read charts and determine both where they are and where they are going. Essential for not getting lost in the vastness of space.

Perception {INT} is an important skill of the present invention and represents a character's overall awareness, as well as their memory. A perception check is made whenever a character has a chance to see, hear, sense, or remember something. A positive outcome indicates that the character saw, heard, sensed, or remembered the event in question.

Performance {MENTAL GROUP} covers the practices of acting, disguise, mimicry, singing, and anything else that is involved in pretending or presenting a performance of some kind.

Persuasion {MENTAL GROUP} is a character's ability to convince, persuade, or influence individuals. This is another skill that is only useful with non-player characters and requires a facilitator to adjudicate.

Physics {INT} represents a combination of theoretical and practical knowledge in the field of Physics. Creative uses might include understanding an alien power system or determining the properties of a spatial anomaly.

Piloting {TECH} is required to effectively make a starship go where you want it to without crashing into things and making a terrible mess out of the day.

Security Systems {TECH} is the ability to recognize and evade various types of alarms and traps. The character also knows how to set up alarms and traps, given the proper time and equipment.

Shadowing {REF, INT} is the ability to subtly follow someone. Also the ability to spot and lose a tail.

Ship Weapons {REF} is the ability to get behind the controls of really, really huge guns and shoot things.

Small Arms {REF} is the skill that covers the use of everything from pistols to shotguns to assault rifles. Both ballistic and energy weapons fall under this category.

Stealth {REF, DEX, INT} entails a character's ability to move quietly and unseen. Typically, it is a contest against another character's Perception+INT to be successful.

Street Talk {CHA, CONF} represents skills that particular characters have in talking to people that work and live on the "underside" of things. Connecting to the black market and finding the "word on the street" are uses of this Skill.

Swiping {TECH} is the skill of kleptomaniacs everywhere, and entails the ability to pick pockets and filch small items from where they were carelessly left by someone else.

Throwing {REF} is the skill that deals with throwing anything from baseballs to knives to Ultimate Bombs of Doom that are about to go off.

Trading {MENTAL GROUP} represents the ability to strike a good bargain with a merchant or customer. This is another skill only useful on non-player characters (except in some rare circumstances).

Weaponsmith {TECH} is the technical skill that deals with the care, maintenance, and repair of most weapons. It can also be used to design and build weapons with the right gear around.

Xenoscience {INT} represents less a stand-alone skill than the ultimate skill enhancement, xenoscience allows a character to more effectively deal with aliens and such things as are associated with them. Dealing with alien elements usually means a much higher Target Number for success, but the xenoscientist may add their rating to the appropriate skill for a better chance at success. For example, someone with Medicine and xenoscience may add the ratings for both together when trying to do an autopsy on a dead alien, while someone with engineering and xenoscience would combine them when dealing with an alien starship.

Special Skills are talents and gifts that some characters may possess that set them apart from their peers. They differ from skills in that they are inherent abilities of the characters, and can not be acquired or improved upon through training. Special Skills have specific game effects that are unrelated to task resolution, or are modifiers to the standard task resolution formula:

$$\text{Attribute+Skill=Action Value, becomes Attribute+Skill+Modifier=Action Value}$$

Absolute Time Sense represents an innate knowledge of the passing of time (Some drugs, e.g. marijuana, will have direct effects diminishing or eliminating "absolute time sense").

Acute Hearing represents hearing in a wider range and more effectively than others; +2 on all related Perception rolls Acute Smell represents the ability to smell a wider range of odors more distinctly than most and can identify things and creatures based on such information; +2 on all related perception rolls Acute Vision represents the ability to see more clearly over a longer range than most and possesses excellent nighttime vision (though not as good as real Night Vision); +2 on all related Perception rolls and +2 vs any Range Combat penalties Ambidexterity is the ability of a character to use both hands equally well Beautiful/Handsome represents +1 on all CHA-related skills where looks would count.

Beautiful Voice represents a character with an amazing singing and speaking voice; +1 related skills/tests Blind Fighting is an Perception+INT roll for no penalties in Hand to Hand while blinded; roll per round Combat Sense represents a natural gift for combat situations; +1 Initiative Double Jointed represents +3 to escape bonds, +1 related Athletics tasks Eidetic Memory means a character never forgets anything seen, heard, or read; +3 on any memory-related skill use. Some drugs (marijuana, diazepam (Valium), alcohol, GHB)—will negatively impact or remove this ability.

Empathic represents a character that is naturally attuned to the way people feel; +1 all CHA Skills Fast Draw is the ability to draw one-handed weapons in no time (0-time Action)

Head For Numbers is the ability to do lightning calculations in one's head

Light Sleeper represents no roll to awaken if noise is made, instantly awake with no ill effects Night Vision represents a character that sees as well in the day as at night, although not in true pitch black Perfect Pitch means a character with a totally accurate ear for tones and musical notes; +3 all related skills Physically Gifted means a character with a natural gift with physical pursuits; +1 all Athletic and related skills.

Rapid Healing represents +3 Hit points healed over each healing period.

Scholastically Gifted means a character that is well-read and naturally gifted with learning; +1 all related skills, including Physics, Chemistry, and Xenoscience.

Speed Reader means a character that can read at about 10× normal rate

Strong Immune System means +3 to resist Poisons and Diseases

Rules Governing Gameplay

Role-playing Games are inherently "turn-based" endeavors, even when they are ultimately modified into "real-time" applications. As some of the game mechanics to be described below operate as a function of time passage within the game, we now briefly describe the time structure of the present invention.

Game play is often conducted in "non-combat time" terms, meaning there is no inherent need to track the passage of time in specific detail. However, whenever the time it takes to accomplish a task is pertinent to the immediate situation, "combat time" is often applied. When this occurs, Character actions are tracked in terms of "Rounds" and "Turns," with rules governing how long something takes put into those terms.

A Round," as defined in our preferred embodiment, is 3 seconds (this is actually variable according to the individual user of the game, owing to the flexibility of the system). A "Turn" is defined as 4 Rounds, or 12 seconds.

Character Definition and Task/Combat Resolution

The outcome of a character's attempt to perform an action within the game is a function of the characters abilities and difficulty of the action being attempted. A character's abilities are classified as either attributes or skills. In the present invention, character attributes model the level of functionality of a variety of the brain and body systems of real human beings, translating them into useful game constructs such as strength, dexterity, intelligence, confidence, and charisma, etc. All characters have a rating in each of the attributes on a scale from 1–10. In contrast to attributes, which are a description of the fundamental capacities of the individual character, characters may also acquire a large variety of skills. Skills differ from attributes in that they may be acquired and/or improved upon through training that the character can obtain within the game, and their utility is generally restricted to specific situations. Skills are also rated on a scale from 1–10.

The outcome of any action attempted within the game relies upon a combination of the application of the appropriate character skill, the related character attribute, and a random opportunity for success, as determined by one of two algorithms. The first algorithm is applied to resolve actions taken against another living thing or person.

$$\text{Attribute}_1 + \text{Skill}_1 + \text{RND}[1-10]_1 \text{ vs. } \text{Attribute}_2 + \text{Skill}_2 + \text{RND}[1-10]_2$$

OR $$\text{Action Value (AV)}_1 + \text{RND}[1-10]_1 \text{ vs. Action Value (AV)}_2 + \text{RND}[1-10]_2$$

OR $$\text{Action Total (AT)}_1 \text{ vs. Action Total (AT)}_2$$

Where "Action Value" (AV) refers to the sum of the Attribute and Skill numbers of the character attempting (subscript 1) or resisting/defending against (subscript 2) the action, RND [1–10] refers to a randomly generated number between 1 and 10, and "Action Total" (AT) refers to the sum of AV and RND [1–10]. If an action value is obtained that is equal to or greater than the difficulty value obtained, the character attempting the action is deemed to have been successful.

For example, if Bill the Bully (REF 5, Hand to Hand 6) wants to hit Harry the Bouncer (DEX 4, Dodging 5), Bill would generate an AT of (5+6+[1–10]) vs a Harry's AT of (4+5+[1–10]) (Bill's REF+Hand to Hand+[1–10] vs. Harry's DEX+Dodging+[1–10]). and Harry rolled a 5, then Bill's action total would be 16, and Harry's would be 14. Bill would have succeeded in hitting Harry.

The second algorithm is used to resolve actions taken against a situation, such as picking a lock or driving a car.
Attribute+Skill+RND[1–10] vs Target Number Where "target number" is a difficulty value of the action, as pre-assigned by the game designers. For example, if Jack the Thief (TECH 5, Lockpick 6) wants to bypass a military grade electronic lock (target number 18), Jack would generate an action total of (5+6+[1–10]) vs a target number of 18. Jack would thus need the randomly generated number [1–10] to be 7 or higher to successfully bypass the lock.

In many cases, modifiers may be applied to the attribute or skill ratings of a character based on game context. For example, if Bill the Bully had been drinking heavily before he attempted to hit Harry the Bouncer, he might receive a –4 penalty to his reflexes [REF] attribute, thus:

Bill the Bully (REF 5[–4], Hand to Hand 6) wants to hit Harry the Bouncer (DEX 4, Dodging 5), Bill would generate an AT of ([5–4]+6+[1–10]) vs Harry's AT of 4+5+[1–10]) (Bill's REF [–penalty]+Hand to Hand+ [1–10] vs. Harry's DEX+Dodging+[1–10]). If both Bill and Harry rolled a 5, then Bill's action total would be 12, and Harry's would be 14. Bill would have now have missed Harry.

In the second example, if Jack the thief were using a set of finely crafted lockpicks (instead of a bobby pin) it might add +2 to his lock-pick skill, permitting him to succeed in bypassing the lock with a randomly generated number [1–10] of only 5 or greater.

The consequence of a successful combat attack is Damage. The present invention simulates damage by the loss of stun points and hit points.

Hit Point damage is serious injury that can mame or kill. Each character begins play with a pool of hit points representing the total amount of hit point damage the character can sustain before becoming killed or otherwise incapacitated. Anytime a character is hit by a weapon they will receive hit point damage. Hit point damage is always subtracted from a character's pool of hit points. When this pool is reduced to zero, the character is dying. All primary attributes receive a penalty of −6, and the character will continue to lose one additional hit point per round until either dead or healed to above zero hit points. When a character loses 2× their body characteristic below zero, they are dead.

Example: Gorn can take 20 hit points (where Hit points Body (4)×5). He is damaged by a weapon and loses 15 hit points. Gorn can take only five more hit points before he is incapacitated. If he takes 8 more hit points beyond that(−body (4)×2) he will be dead.

Whenever a character's hit points have been reduced enough, they become impaired. When a character is at ¾ of their total hit points, all of their primary attributes are reduced by 1; at ½ of total, they are reduced by 2 points; and at ¼ of total, they are reduced by 4 points. An attribute can not, however, be reduced to less than 1.

Stun Point damage is damage that creates pain and shock, but not lasting injury. All characters have stun points as well as hit points; a measure of how much damage they can take before they pass out from pain and shock. Stun Point damage is generated as a collateral effect of receiving hit damage, with one point of stun damage delivered for every point of hit damage taken. Stun damage can also be delivered directly by certain stunning weapons or bear handed attacks. Because stunning blows are often serious enough to cause collateral "killing" damage, one point of hit damage is taken for every five points of stun damage received in a stunning attack. Stun damage is always subtracted from a character's pool of stun points. When a character receives more than ½ of their total available stun points pool in one attack they are stunned. A stunned character can not act in the next phase and is at a −5 penalty to all primary characteristics. He can not move, and he may not take any other actions. He will remain stunned for one phase, becoming "un-stunned" next phase. When a character's stun points reach zero, the character will pass out. The character will remain incapacitated until sufficient stun points have been recovered to restore the total number of points in the character's stun points pool to a number greater than 0.

A Character becomes Dazed whenever they 1) take more than ½ their total stun points value from any single attack, or 2) the damage they receive from a single killing attack exceeds their threshold value (see derived attributes, FIG. 1). In either case, a dazed character is at −5 to all their Action Values and can perform no action during the next round. Following that round they will have recovered from being dazed.

When a Character reaches 0 stun points or lower, they are unconscious. They cannot act in any fashion and all Action Values are treated as being 0.

When an attack is successful against a living target, a random amount of damage is applied according to a total expressed by the algorithm "Xd6," where X is the assigned number of "Damage Dice" for the type of attack in question and d6 represents that a six-sided die (or random integer between one and 6) is used for each Damage Die. For example, a knife would do 1d6 of damage, while a fragmentation grenade might do 6d6 of damage.

This damage will be classified as either stunning or killing. Stunning damage (such as pummeling with the fists) is applied primarily to stun points (where the target suffers 1 hit point for every 5 stun points, or rounded fraction thereof, suffered), whereas killing damage (such as stabbing with a knife) is applied equally to stun points and hit points.

Targets will always have a certain amount of defense against stunning attacks (their stun defense, or SD characteristic), and those wearing some kind of body armor will also have a killing defense (KD) value to apply to killing attacks.

If an attack hits, the Damage Dice are rolled and the applicable defenses are subtracted from the result. The remaining result is subtracted from the character's remaining pool of stun points (if a stunning attack) or the remaining pools of hit points and stun points (if a killing attack).

Stun points are recovered at a rate that is a function of the character's recovery attribute [EC] and the amount of stun damage the character has currently sustained:

| Stun Level | Recovery Rate |
| --- | --- |
| 0 to −10 | REC/Round |
| −11 to −20 | REC/Turn |
| −21 to −30 | REC/Minute |
| −31 to −40 | REC/5 Minutes |
| −41 to −50 | REC/20 Minutes |
| −51 to −60 | REC/Hour |
| etc . . . | |

Hit points recover at the rate of REC/3 days under normal circumstances, REC/day if the character is in a hospital or under effective care, and REC/week if the character is doing little to take care of themselves and their injury.

For purposes of our preferred embodiment of the invention, there are three main manifestations of the concept of character advancement. The first deals with a player's sense of their character's social placement in the community of the game. This can be measured in terms of their actual rank (as would be the case of a military or paramilitary organization they belonged to), their job title, their political position (if they are a part of a governing body), or any number of less tangible but no less notable measurements. Such placement will be the direct result of their character's actions (or failure to act) during game play, especially as such actions relate to their missions and goals and the expectations of the story they are a part of.

The second deals with the player's sense of placement in the online community of other players that have their own player-characters involved in the game. This can be both quantified and more ephemeral. The game will acknowledge the better players by displaying quantitative evaluations of their performance and acknowledging their obvious commitment to the game environment. It will also reward such players with positions of authority and direct input into the game, primarily manifesting as assignments as Mentors and similar roles. Less tangible will be matters of reputation among the other players—such a community as develops around online role playing games never fails to have its own "rumor mills" and social dynamics. The online "neighborhood" will note with approval or disdain such actions as warrant its notice.

The third and most acute measure of character advancement is the actual improvement of that character's attributes and abilities. The player earns experience points through continued participation in the game, with bonus awards of such points awarded for particularly effective or entertaining play and deductions for inappropriate or poor play.

These points are further utilized in making improvements to the character by directly enhancing that character's primary and secondary characteristics, improving skill values, or even adding new skills and abilities. The schedule for awarding and utilizing experience points is as follows:

Awarding Experience Points (XPs)

Experience points, which are used to purchase improvements for characters, are awarded on the following schedule:

| Action | |
|---|---|
| | General XP |
| In a Scenario | 1 |
| In a multi-part Scenario | 1 per "Part" |
| Successful Scenario | +1 |
| Very Successful | +2 |
| Outstanding Success! | +3 |
| Severe Failure | −1 |
| Disastrous Failure | −2 |
| Scenario was Difficult | +1 |
| Scenario was Really Difficult | +2 |
| Scenario was a Killer! | +3 |
| | Specific XP |
| Trained in a Skill/Ability (1) | +1 |
| Trained for a While (1) | +2 |
| Trained a Long While (1) | +3 |
| A Natural 3 or 18 Rolled | (2) +5 |

The following charts are used for increasing or acquiring abilities as the character progresses. Also, a player must buy a lower level to achieve a higher one. In other words, to go a 5 to a 7 in a skill, a player must spend 13 points (6 for Level 6 and 7 for Level 7), and to go from a 4 to a 6 in a characteristic costs 55 points (25 for Level 5 and 30 for Level 6).

| Skill Level | XP Cost | Characteristic Level | XP Cost |
|---|---|---|---|
| 1 | 1 | 1 | 5 |
| 2 | 2 | 2 | 10 |
| 3 | 3 | 3 | 15 |
| 4 | 4 | 4 | 20 |
| 5 | 5 | 5 | 25 |
| 6 | 6 | 6 | 30 |
| 7 | 7 | 7 | 35 |
| 8 | 8 | 8 | 40 |
| 9 | 9 | 9 | 45 |
| 10 | 10 | 10 | 50 |

Drug Intervention

We now describe the preferred embodiments of the components of the drug intervention. Many components of the drug intervention will apply to a number of different drugs that share effects in common. We therefore describe the individual components of our drug intervention, and list examples of the drugs for which these intervention components are used. Note that these effects applied to both player characters and non-player characters. Also note that the degree of effect size of any simulated drug effect will be a function of a plurality of underlying factors, including the characters attributes, the drug in question, the character's drug use history, and the time course of the drug effects. Specifically, the invention models the phenomena of sensitization (increased magnitude of drug effects with repeated exposures), habituation (decreased magnitude of drug effects with repeated exposures), and withdrawal effects (a shift in physiological or psychological function in the absence of drug presence within the body, as a result of prior, usually protracted, drug use).

"Physical Addiction" Withdrawal Effects

NAUSEA, VOMITING, and DIARRHEA: (opiate withdrawal, also as a direct effect of drug poisoning, such as in the case of alcohol for nausea and vomiting) Penalties will be applied to the strength, constitution, body, charisma, reflexes, dexterity, movement, and technique statistics, as well as all derived characteristics rely on these basic characteristics. During instances of vomiting or diarrhea, movement will be reduced to zero. These changes will be indicated on the character's "Attributes" screen by replacing the normal stat with the modified stat, presented in a different font or color to indicate that it has been changed. The graphical display may depict the character's difficulties.

"Psychological Addiction" & Withdrawal Effects

CRAVING (all addictive drugs): A dialog box will appear on top of the viewscreen, containing a message to the effect that the character desires to use some of the drug that he is addicted to. The player will be unable to proceed with any other action in the game until the dialog box is responded to. If the character has access to the drug, the player will be given to alternatives to choose from. The player's choices will be to use the drug now or to keep (or retrieve) the drug for later use. If the player does not wish use or to carry the drug on his character's person, the player must subsequently used being "drop" command to get rid of the drug. If the character does not have access to the drug, the player need only click on a button labeled "okay" to close the dialog box and continue playing the game. The frequency with which these dialog boxes are presented will represent the degree to which a character is in addicted to a drug.

COMPULSIVE DRUG USE (all addictive drugs): In the "idle state" (when the player is not currently direct in his character to move), the addicted character may spontaneously approach, acquire, and use drugs to which the character is addicted when they are freely available in characters vicinity. The player must issue a stop command to halt this sequence if he does not wish to let his character use the drug.

CRAVING AND FLASHBACK TRIGGERS (all addictive drugs): When the character approaches stimuli associated with drug use (for example, when a character that smokes the approaches a cigarette vending machine, or sees another character smoking), craving is triggered. In the case of drugs whose use can subsequently lead to "flashbacks", presentation of stimuli associated with those drugs, especially under stressful (such as combat) situations, can lead to a recurrence of the drug induced effects, even without the character taking an additional dose of the drug.

Direct Drug Effects

PAIN KILLING: (opiates, dissociative anesthetics e.g., PCP) The "Stun Damage" effects of attacks that normally cause "Stun" will be reduced or eliminated. Impairment penalties will be reduced, effectively allowing a character to "die on their feet," when they would otherwise collapse from pain, unable to continue, although still very much alive. However, "bleeding" damage penalties will be applied. That is to say, when a character that is wounded to the point that pain would normally prevent him/her from performing utilizes pain killers to continue functioning while wounded, the physical actions this character then takes will themselves directly damage the character. These changes will be indicated on the character's "Attributes" screen by replacing the normal attribute with the modified attribute, presented in a different font or color to indicate that it has been changed.

HALLUCINATIONS (LSD, PCP, Other Hallucinogens)

VISUAL: Mild hallucinations will be portrayed by "lens effects". Lens effects are where the graphical display on the view screen appears as if a clear, warped lens were held between the users eyes and the computer screen. Stronger hallucinations involve two-dimensional objects taking on three-dimensional appearance, and perhaps some appearance of motion. Frank, confabulatory hallucinations involve replacing the normal artwork for a given game object with some alternative artwork or animation. For example, a friendly waiter carrying a tray might appear as a blood splattered alien wielding a mighty weapon.

AUDITORY Sound effects normally presented as originating from specific game characters or game objects will be presented in the absence of the usually associated game character or object.

INEBRIATION, BALANCE AND COORDINATION, REFLEXES: (alcohol, depressants) The initiative, reflexes, dexterity, and technique attributes (and all attributes derived to therefrom) will receive penalties. These changes will be indicated on the character's "Attributes" screen by replacing the normal attribute with the modified attribute, presented in a different font or color to indicate that it has been changed. The player's ability to control his character's movements within the virtual environment on the viewscreen will be modified (decreased) to model the effects of inebriation. A delay will be introduced between the players input for control of movement (via the keyboard, or any ties a plurality of input devices) and the program's response moving the character through the environment. Phasic perturbations to the character's position in or movement through space may also be applied (e.g., such that the player must actively respond through the input device simply to keep his character stationery, or headed in the direction in the player intended).

"EMPATHY": (ecstasy, ADAM, EVE, etc.) The drug-influenced character's charisma stat will be raised, and the character will suffer a penalty when defending against "presence attacks". Under certain circumstances, system messages are sent to the player indicating how the player's character "feels" about the character they are interacting with. Under the influence of these drugs, this statement that would normally be presented will be replaced by a "friendlier" statement (e.g., the statement "She does not seem to trust you." might be replaced with "She seems to trust you."). Similarly, the "mood font" for "in character communication" may be changed by the program to one representing a more pleasant mood (e.g., from the "hostile" font to be "neutral" font, etc.).

SHORT-TERM MEMORY LOSS (marijuana, alcohol, depressants) The character can recall facts learned in the past, but can not keep track of what is going on in the present, and certainly can not learn anything new. Players well not be able to have their characters improve upon existing or acquire new skills while experiencing these effects. The character may forget what he is saying mid-sentence, into may have difficulty following a conversation. Therefore, messages sent to or from the drug-impaired character may appear in part or not at all on the players' screens. The conversation logs will be incomplete or blank for those times during which the character was experiencing this drug effect. The character will also have difficulty performing tasks that involve concentration, such as driving a vehicle. The character simply forgets that they were paying attention to performing a task and their attention wanders. This will be modeled by requiring repeated instructions from the input devices before "the character" is "spurred into action" (that is, before the program will respond appropriately).

MEMORY CONSOLIDATION OR "LEARNING" BLOCK. (alcohol, PCP, valium) In the extreme, this would be a blackout. "At the moment", while under drug influence, the character does not suffer the short-term memory loss symptoms described above. However, the next day, the character is unable to remember what happened of the evening before. Thus, a conversation log may appear intact if the player checks it while his character is experiencing the drug effects, but will be incomplete the following day. The character may practice, and improve upon, a skill, but the following day the improvements in that skill have vanished.

"AMOTIVATION SYNDROME" (marijuana, alcohol, etc.): In many ways, simply a description of the outcome of having a hangover. One doesn't feel like doing, and probably does not do, all the ambitious things otherwise planned on. The game effect is that a character does not engage in the default "off-line" activities selected (e.g., study, work overtime at a home business, etc.) but instead chooses to rest. The player may "push through" and force his character to engage in these activities, however to do so the player must log into the system daily and re-assert instructions for the character to perform these activities while "off-line."

APPETITE STIMULATION, "THE MUNCHIES" (marijuana, diazepam): Similar to "craving," except that food is sought out.

"SELF-CONFIDENCE ENHANCEMENT" (cocaine, other stimulants): This effect can range in degree from a "confidence boost" (Okay, I'm going to introduce myself to her!) to full-fledged, psychotic "delusions of grandeur" (I AM, in fact, the second coming of Christ!). Generally speaking, the user becomes convinced they are brilliant, while the particular manifestation depends upon the user ("I am a brilliant___!" {Conversationalist, theologian, strategist, chess player, warrior, womanizer, etc., although anything the character can do the character will think they can do better}.

This will be translated into game-play by indicating a drug-induced improvement in the character's attributes and/or skills on the statistics screen (so indicated by a displaying the "new statistic" in a different font or color). There will also be a drug induced "improvement" in the numbers that appear on an object indicating the probability of success when an action has been selected and the mouse pointer is placed over the target object. However, no alteration is made in the stat actually used or the target number derived for determining the outcome of events. At the moment when actions are attempted, a "% chance of success" reflecting the players to actual chances of success will be displayed on the viewscreen, giving the players the opportunity to "figure out" that although the drugs seem to improve skills and attributes, they do not.

STIMULANTS AND FATIGUE AND ALERTNESS (nicotine, other stimulants): Fatigue and drowsiness penalties are countered by stimulants.

"STEREOTYPY" (cocaine, PCP, other stimulants): In brief, this means that mental and behavioral patterns are repeated.

IMPAIRED PROBLEM SOLVING/STEREOTYPED THINKING: If one attempts to use a strategy to solve a problem, and that strategy fails, on subsequent attempts to do solve the problem the original strategy is repeated, rather than adjusted to meet the present conditions. (By way of extreme example, if a character tried to push a door open to exit the room only to discover it would not budge, the character could try to push his way out of the room all day without ever thinking of trying to pull the door open).

The game incorporates this phenomenon into play by tending to force the player to continue to select the same action in a given situation. Thus, on a first attempt to perform an action, all normal enough options are presented in the pop-up menu. However, on subsequent attempts (when the menu is next accessed), there is a 75 percent chance that all options are grayed out except the option previously chosen. Once the outcome is randomly determined, it is locked-in for a period of one round (60 seconds of "game time").

STEREOTYPED SPEECH PATTERNS: People dwell on the same conversational topic, repeating themselves frequently, possibly repeating exactly the same words. The game translates this into play by selecting text from messages the player previously sent "in character" into re-sending the message without the player's intent to do so.

STEREOTYPED FIXED ACTION PATTERNS (behaviors): These are any patterns that the character has learned how to do "without thinking" that they start doing repeatedly (field stripping and resembling a weapon, tapping fingers on the desktop, pacing, personal fidgets). The game illustrates these effects by replacing a character's normal idle state actions (an occasional graphical display of an action such as shuffling feet) with repetition is presentation of stereotyped behaviors such as those listed above (pacing, etc.). The idle state actions may temporarily take over control of the character: the player may not direct his character to take a new action until the previous (drug-induced) action is completed.

HYPER VIGILANCE: This is "checking behavior", e.g. checking the doors and windows to see if anyone is there. The game treats this as a subset of the stereotyped fixed action patterns described above, with the addition that uncalled-for perception checks are made by the character.

"LOSS OF IMPULSE CONTROL" (PCP): A person seems to lose all sense of consequences. For example of person might jump out of window, not to commit suicide, or because they think they can fly, simply be cut is they wonder what it would feel like on the way down, and they hadn't considered what would come after that. Basically, people act out any thought that comes into their head. A common consequence is that otherwise nonviolent people may become quite violent e.g., on the highway, at the Post Office, waiting in line anywhere, etc. This is really bad in combination with the drug effect "aggression". The game illustrates this effect by occasionally selecting an object and an available action at random, and performing it without the player's intent. Such a randomly selected action may become repeated as a result of they "Impaired Problem Solving/Stereotyped Thinking" effect.

"AGGRESSION" (PCP [all characters], alcohol [if a character is pre-disposed to it by a "hidden" genetic predisposition]): The game will simulate drug-induced aggression by restricting the selection of mood fonts for in-character messages to the aggressive selections, by restricting the actions available in pop-up or pull down menus to the aggressive choices ("brandish weapon" might remain available while "shake hands" becomes unavailable). And some situations, the game may automatically select and execute an aggressive action without the player's intent. For example, an unfamiliar character says "Don't move!" and the program causes to player's character to draw his weapon and shoot with no input from the player.

Online Mentors: The preferred embodiment of the game will also provide a facility for mentor based teaching within the game. Certain characters (Doctors, Policemen, Scientists) within the game will be assigned the role of "official" sources of accurate information about drugs. These characters will have the ability to display identifiers (like a badge) that identify them to all the other players as recognized sources of accurate drug information. These characters will be controlled by individual players who have established their knowledge about the effects of drug abuse, and who have agreed to play the role of mentors within the game as an effective means of disseminating this knowledge to others. As examples, these within-game mentors might be controlled by teachers, police officers trained to work in the field of substance abuse, or any other players who have demonstrated they have the requisite knowledge to serve as mentors.

EXAMPLE

The following example illustrates how an embodiment of one game-scenario of the present invention develops and concludes. It is understood that particular game scenarios of the present invention can be conducted over long periods of times, including weeks, months, and even years. The present game scenario example includes four players, referred to as players A, B, C, and D, and playing the characters Alpha, Beta, Gamma, and Delta, respectively. All other characters described in these examples are non-player characters controlled by the computer software. In these illustrations, player A is what the most experienced player, and has spent substantial time and effort building and improving his character "Alpha". Players B and C have intermediate levels of experience playing the game and thus their characters are moderately developed, while player D and his character "Delta" are new to the game. In both examples the players have made the following decisions about their character's use of drugs. Alpha does not use and has never used drugs of any type. Beta smokes tobacco cigarettes. Gamma drinks alcohol. Player D plans to have "Delta" lead a rich life, exploring as much of the (game) universe as possible, while rapidly advancing his power and status within the game. In this example, Alpha, Beta, Gamma, and Delta are "secret agents." The mechanics of players logging into a game are omitted, and the example begins with the characters gathered in "Marcell's", an upscale restaurant and bar. In these examples, Marcell's serves the function of a gathering point for characters of players who have just joined the game. Here the players form groups that will play together as a team for the remainder of the game session, and it is usually here that the team of characters will obtain the mission assignments that start an adventure episode.

Scenario Prologue

The secret agents meet for dinner at Marcell's, and inform their command center of their whereabouts "just in case" their services should be required. A few minutes later, Control contacts them via cell phone and sends the group on an urgent mission to the embassy of the Tal'Ru. The agency's contact within the embassy has reported the mysterious disappearance of the ambassador and his wife during a soiree they were hosting for the parties to the Tal'Ru's proposed trade settlement with earth. The agents are told to that it is critical that the delicate Tal'Ru trade negotiations proceed without incident. The agency has information that an "unauthorized transmission" is scheduled for 19:30 this evening. Their mission is to enter the embassy, debrief the contact, prevent the transmission, and defuse and resolve any situation that might threaten the Tal'Ru delegation or our trade negotiations with them-without creating a public incident. Their contact will be a young woman wearing a jeweled flaming sword brooch. The agents accept the mission, and Delta drives the group to the embassy. As the most experienced character in the group (Player One has played the most and the experience has earned Alpha promotions in rank), Alpha is the highest-ranking agent in the group, and therefore has been assigned as the commander of this mission. The examples begin as the group reaches the embassy.

{Note that for purposes of illustration, all "randomly determined numbers from [1–10]" will be the number 5, and result in the consistent (fixed ratio) application of the intervention. In the actual invention, it will be the random determination of the numbers that will implement the application of the intervention on a Variable Ratio schedule, described above, as a function of the randomly determined numbers.}

Viewscreen

The players enter the Embassy and find themselves in a large ballroom. About 160 characters in formal attire fill the room, the gathered in conversation groups of from 4 to 8 characters. Many of the characters can be seen to be smoking and/or drinking. Wait staff periodically enter and exit the ballroom through doors at the back of the room labeled "Kitchen Staff Only". There is an open bar, and several tables covered with hors d'oeuvres are placed about the edges of the room. To the right there is a grand staircase leading up to the second floor of the Embassy. To Embassy guards are standing at the top of the stairs.

[Through "in character" conversation, the players decide to split up and look for their contact.]

Alpha>"All right, team. We'll have to act quickly if we're going to stop that information from being transmitted at 19:30 tonight. Let's split up and find our contact as quickly as possible. Remember, she will be the only one here are wearing a jeweled flaming sword brooch."
Beta>"Yes Sir."
Gamma>"Sure thing."
Delta>"Ok."

[The players move their characters into the room in different directions, searching for an avatar wearing a jeweled flaming sword brooch. (The brooch would only be apparent on the viewscreen when the Player's character was standing in close proximity to the avatar in question.)]

BETA

[Player B has Beta enter the crowd, a cigarette girl steps forward and addresses Beta.]

Cigarette Girl>"Hey handsome, need a smoke?"

[Player B moves the cursor over her character, highlighting the girl. He left-clicks on her, which calls are up a menu of possible actions for Beta to take. Player B selects "Dialog". He is then presented with a menu that contains the selections "Yeah, sure.", "No, thanks.", and a text entry box labeled "Other". Player B selects the first option.]

Beta>"Yeah, Sure."

[Player B examines the graphic of the cigarette girl, but does not observe a flaming sword broach. Player B calls up the menu of possible actions for Beta to take and selects "Inventory." He first selects the cigarettes he has just acquired then selects the lighter from his personal inventory. The "lighter" cursor icon appears on his viewscreen. He places it over the cigarette, which highlights it, and then left clicks, lighting it. Player B receives a message from the program that Beta is smoking a cigarette. On the viewscreen, Beta's avatar can be seen smoking a cigarette. In a few minutes the graphical display will show Beta dispose of the cigarette butt. Because Player B has frequently had Beta smoke in the past, Beta has been flagged by the program as a smoker. The program will therefore periodically inform Player B via the "out-of-character" communication line that "Beta could use a cigarette." If Player B ignores too many of the system messages (does not have Beta smoke), a message box will appear periodically on Player B's viewscreen containing the message "Beta could really use a cigarette." "Click OK to continue." Player B must click on OK before he can take any other action.]

[Player B now has Beta approach a group of four female characters, none of whom are wearing a flaming sword broach, and none of whom are smoking. He selects "Dialog", highlights and clicks on one of the characters, and selects . . . ]

Beta>"Excuse me, I am looking for a friend of mine. She, um, kind of defies description. Let me see . . . she is wearing a very distinctive jeweled flaming sword broach this evening."

[The program checks for the female character's reaction to Beta. The outcome will be determined by the formula:

CHA+Conversation+[1–10] vs. Target Number (13)

Where the target number of 13 for this situation was pre-determined by the game design. Since Beta has a CHA of 7 and a Conversation rating of 4, the outcome of the interaction would normally turn out in Beta's favor on a randomly determined integer of 2 or greater. When interacting with smokers, he gets the response:

Smoker>"I'm sorry, I haven't seen anyone meeting your description here"

However, since Beta is smoking, he suffers a −4 penalty to Charisma when interacting with non-smokers. Since Charisma is the attribute associated with the use of the conversation skill, the −4 penalty means that the interaction will turn out in Beta's favor on a randomly determined number of 6 or greater. A randomly determined integer of 5 therefore results in a NEGATIVE outcome for Beta. Beta obtains the following dialog from each non-smoking character in the room]

Non-smoker who doesn't know girl with brooch's whereabouts>"I really don't like cigarette smoke, would you mind putting that out?"

Or

Non-smoking friend of girl with brooch>"Clarissa doesn't like smokers. Why don't you put that out."

[Beta moves from group to group and gets the same responses until either one of 2 events occurs:

1) His cigarette pack runs out of cigarettes. 2) Player B selects "Do not smoke" from his "Actions" menu. Thereafter, because the program has flagged Beta as a smoker and he has not smoked recently, a message box will appear periodically on Player B's viewscreen containing the message "Beta could really use a cigarette." "Click OK to continue." Player B must click on OK before he can take any other action.]

The message box models craving. The frequency with which the message box appears is a function of how long Beta has been smoking (in this and previous game sessions) and an inverse function of how long it has been since Beta quit smoking (also in this and previous game sessions). Beta will also experience stimulus induced cravings—when ever he gets close to the cigarette girl (or any cigarette dispenser, or someone smoking) the message box will appear much more frequently. Furthermore, Beta can join a smoking cessation program to accelerate the disappearance of the messages. This realistic representation of cigarette craving will facilitate stimulus generalization from the game to the real world. Also, since the message box's appearance interferes with gameplay it is aversive. This contributes to a conditioned aversion to smoking.}

[Player B discusses the situation with Player A in "out-of-character" communication mode.]

Player B (after some time)>"Has anyone found the girl with the brooch? This is getting DULL, maybe we need to try something else."

Player A>"I haven't seen her or found anyone at the party who has. Same for you?"

Player B>"I found one woman who said 'Clarissa doesn't like smokers, why don't you put your cigarette out' but that's all the information I could get out of her."

Player A>"Did you try putting out your cigarette? The game models some of the real-world responses to smokers. Put out your cigarette and see if you can get more out of her.

Player B>"Oh, OK I will."

Player A>"By the way, if you tell the Cigarette girl 'no thanks, it makes my breath stink' or 'its bad for my health, she'll leave you alone after that. A little trick Alpha learned from the University Professor."

[By linking attainment of a common goal (finding the girl with the brooch) to substance use avoidance, the game has encouraged Player A to engage in peer-based teaching of Player B.]

[Player B selects the action "Do Not Smoke" and has Beta enter the crowd. A cigarette girl steps forward and addresses Beta.]

Cigarette Girl>"Hey handsome, need a smoke?"

[Player B moves the cursor over her character, highlighting the girl. He left-clicks on her, which calls are up a menu of possible actions for Beta to take. Player B selects "Dialog". He is then presented with a menu that contains the selections "Yeah, sure", "No thanks", and a text entry box labeled "Other". Player B selects the third option.]

Beta>"No thanks, it makes my breath stink and its bad for my health."

{Player B is rehearsing social resistance skills}

[The cigarette girl leaves Beta alone. Since this removes the adverse consequence of the cravings message box's appearance whenever the cigarette girl is near, the procedure provides negative reinforcement for using his social resistance skills]

[Player B has Beta return to the woman who knew Clarissa. He makes his inquiry. Without the −4 charisma modifier, Beta gets a positive conversation outcome on a 2 or higher. The randomly determined number 5 results in a positive outcome.]

Woman>"Thanks for putting out that cigarette.

{positive reinforcement for not smoking}

Woman>Clarissa's standing in the back corner of the room. Do you see her? Over there by the stairs."

{this is conditioned reinforcement for not smoking—the positive game consequence (information) is linked to not smoking}"

Beta>"Thank you very much!"

[Beta approaches Clarissa, uses a secret password to identify himself as working with "the Agency", and surreptitiously informs the others to meet on the veranda so they can speak with Clarissa in private.]

Gamma

[Player C moves Gamma over towards the bar, eavesdropping on group after group as he makes his way across the room. The program determines his successes/failure according to the algorithm:

INT+PER+[1–10] vs Target number (13), where the target number of 13 for this situation was pre-determined by the game design. With an INT of 7 and a PER of 4, Gamma overhears conversations on a randomly determined integer of 2 or greater.]

[In prior gameplay, Player C has repeatedly had Gamma drink alcohol at every opportunity within the game. The game has flagged Gamma as a compulsive alcohol user. The consequence is that whenever Player C allows Gamma to stand still for a moment near an available alcoholic beverage, Gamma automatically walks to the beverage, and Player C must choose whether or not to consume it. {THIS MODELS COMPULSIVE ALCOHOL USE}]

[A waiter carrying a tray of champagne filled glasses can be seen in the ballroom. Player C now observes as, without instruction from Player C, Gamma automatically walks towards the waiter.]

Waiter>"Would you like a drink, Sir?"

[A dialogue menu appears with the choices "Yes, thank you" and "No, thank you." available. Because Gamma is a compulsive alcohol user, if Player C does not manually respond by clicking on "No, thank you!" within 1 second, the program automatically selects "Yes, thank you!" for him. Player C still fancies Gamma as a drinker, and permits the auto-selection]

Gamma>"Yes, thank you!"

[The system informs Player C that "Gamma" is drinking champagne. On the viewscreen, Gamma's avatar can be seen drinking from a glass. In 4 minutes the program will inform Player C that Gamma has finished his drink, and the glass will appear empty. While Gamma is holding an alcoholic drink, he does not automatically approach available alcohol, but once the drink is finished, the consumption cycle begins anew]

[Gamma arrives at the bar having overheard only useless information. The bartender addresses Gamma, a similar exchange takes place, and Gamma takes another drink. Player C notices that one group of gentlemen are maintaining their distance from the rest of the attendees. He moves Beta over to a nearby painting, selects a member of the group, then right clicks on him to bring up the interaction menu. He selects eavesdrop. As per the example above, he is able to hear the conversation on a randomly determined integer of two or greater. Given a randomly determined integer of 5, Gamma successfully eavesdrops on the conversation. (Given this situation, if Gamma failed to successfully eavesdrop with a randomly determined integer of one, Player C would simply attempt eavesdropping again until successful.)]

Stranger A>"Don't worry about the old man, we told him his brat had gotten injured and was rushed to the Med. Center while she was on the phone upstairs. He and the misses took off and by the time they get any straight answers out of the hospital and get back, we will be finished here."

Stranger B>"Good, because tonight has got to be it. Someone has caught on, and we don't have anymore time."

[Beta approaches Gamma and addresses him in whisper mode]

Beta (in whisper mode, so only Gamma can hear)>"I found our contact, meet us on the veranda."

Delta

[In a different part of the room, Player D has Delta moving among the guests, speaking occasionally but listening and eavesdropping (as above) a lot. Eventually, Delta overhears a conversation of interest.]

Large Stranger>" . . . so, when you can see you are about to get into combat, you just take a hit of this PCP and you can just keep right on fighting no matter how much damage you take like you weren't even injured at all. Of course, as long as you don't get killed, that is."

[Player D finds this interesting, and decides to have dialog with the large stranger, using the methods described above. Ultimately, Player D chooses to have Delta purchase some PCP from the large stranger. The PCP is added to Delta's inventory.

[Beta approaches Delta and addresses him in whisper mode]

Beta (in whisper mode, so only Delta can hear)>"I found our contact, meet us on the veranda."

Alpha

[In a different part of the room, Player A has Alpha moving among the guests, speaking occasionally but listening and eavesdropping (as above) a lot. In this example Alpha obtains no information of interest]

[Beta approaches Alpha and addresses him in whisper mode]

Beta (in whisper mode, so only Alpha can hear)>"I found our contact, meet us on the veranda."

Clarissa, on the Veranda with Alpha, Beta, Gamma, and Delta

Clarissa>"I've been investigating a security leak that was recently discovered. I overheard Goodings, one of our staff who I had believed above suspicion, saying that 'the operation was uncovered' and they were 'going to have to finish tonight'. He said that they would send the data at 19:30 during the party and that this would be the last one. I slipped away from the party while Father was giving a speech and contacted Control about the new time. By the time I got back downstairs, Mother and Father had disappeared and not one of our security officers to be found. A few minutes later I noticed the thugs you see about filtering in, and I have never seen them before. I asked around a bit about my father, but no one knows where he is. I contacted Control again, and he said you were on your way. He gave me new orders for you. First, find and rescue Father; second, get Mother and me to safety; third, if possible, stop the transmission.

Gamma>"Excuse me, Clarissa, but is one of those men over there Goodings?"

Clarissa>"Yes."

Gamma>"Then, given traffic this time of night, about now the Ambassador is shouting at an emergency room nurse over at the hospital to tell him where his daughter is. I listened in on Goodings' conversation earlier and heard him mention something about sending the 'old man' and his wife on a wild goose chase. He told them you were injured."

Alpha>"So the Ambassador and his wife are safe. Good work Gamma! I wish all of our jobs were that easy."

"Clarissa, where is the transmitter and how do we get to it?"

Clarissa>"The transmitter is located in Mr. Jennings' office, on the third floor. Take the stairs up to the $2^{nd}$ floor men's rest rooms. The guards might ask, but with this many people here they'll let you through. Go out the window in the restroom. About 15' to the right are the fire-escape stairs. You will have to use the ledge to get to them. Take the stairs to the third floor landing. The window off the landing will get you into Mr. Jennings' office. I believe the transmitter is in his antique clock on his desk. It should have some way to hook to his computer, which has access to the Embassy network."

Alpha>"Beta, you will stay with Clarissa and slowly work your way out of the embassy. Gamma, Delta and I will attempt to stop the transmission and meet you at the car. Its 19:17, it will be tough to disable the transmitter and get out before 19:30." {The players lost 5 minutes time earlier because the non-smoker would have nothing to do with Beta while he was smoking. Jeopardizing the completion of their mission is an aversive consequence being attached to tobacco use, conditioning avoidance of tobacco use.}

Alpha, Gamma, and Delta, in the Second Floor Men's Room

Player D, (to players to A and C in the "out-of-character" communication mode)>"I had Delta by some PCP from a guy in the ballroom. Is it really good for helping your character keep fighting even when they're injured?"

Player A>"Yes, but I'd stay away from it anyway."

Player D>"Since my character Delta is a new character and he is still kind of puny, you think he should take the PCP now, in case we run into resistance?"

Player C>"It couldn't hurt."

Player A>"Yes it could! The drugs in this game are just like drugs in the real world. With PCP you could loose control of Delta. He may go off and do things on his own you don't want him to, like get into a fight to the death that you can't pull him out of."

Again, the game design has engendered peer based teaching. Player A is educating Player D about drugs to help the group obtain its mission objective.

[FOR PURPOSES OF ILLUSTRATION of PCP's game effects, in our example Player D's curiosity gets the better of him, and he has his character, Delta, take a dose of PCP despite the good advice. Player A clicks on the restroom window, and selects open from the pop-up menu. Each player then has their character walk across the ledge outside the restroom window to the fire escape. Since, for the purposes of this example, each character has the same Dexterity attribute (7) and Athletics skill (4) ratings, their chances of walking across the ledge to the fire escape stairs without falling (Target Number of 12) are:

Athletics+DEX+[1–10] vs. Target Number for walking the ledge or

4+7+[1–10] vs. 12 a random integer of 1 or greater out of [1–10]=100%

Each player places his cursor on the ledge outside the window. The ledge becomes highlighted and for players A and D,"100%" appears the view screen directly above the ledge.

Player C's character Gamma, however, has been drinking heavily, and has a −5 penalty to his Dexterity. His chances of traversing the ledge are thus:

4+(7−5)+[1–10] vs. 13=a random integer of 6 or greater out of [1–10]=50%.

Player C then clicks on the ledge, Gamma (with a randomly determined number of 5) Falls off the ledge and lands in the bushes below with a loud crash, taking more than half of his available stun and HIT POINT damage.

In another embodiment of the invention, the players control their movement through the use of a joystick, or the direction keys on the computer keyboard, or any of a plurality of input devices. Visual feedback from the view screen indicates that a misstep could lead to a fall, but the ledge is wide enough that the players of unimpaired characters can readily maneuver their characters over the ledge to the third floor fire escape landing. However for the player of the impaired character, the computer response to the movement control input device is sluggish and variable, making it quite difficult for the player to traverse the ledge without falling.

Alpha>"Gamma, how did you manage to fall off the ledge? It was a mile wide!"

Gamma>"Umph"

Player C>Gamma can't talk yet, he took a lot of HIT POINTS and he's dazed.

Alpha>"Gamma, when you've caught your breath, get to the car and stay out of sight. Take off if you have to, we'll get out on our own."

As a result of alcohol's lowering of Gamma's Dexterity attribute, Player C has suffered the adverse consequences of being unable to participate in the rest of the mission, of loosing the share of the Experience Points (XPs) for participating in the completion of the mission, and of placing his character and the rest of the mission in jeopardy. This attachment of realistic, adverse consequences to alcohol abuse is designed to lead to avoidance of alcohol within the game in the future (avoidance learning) and therefore to conditioned avoidance of alcohol abuse in the real world.

[Alpha and Delta open the window over the fire escape landing and enter Mr. Jennings office. A large office desk dominates the room. There's a computer on one corner of the desk. Mr. Goodings can be seen in the office rifling through some files. He appears to be un-armed.]

Alpha (in whisper mode to Delta, who is closest to Mr. Goodings)>"We want to take him alive, the Agency will really want to question him. Also, we don't want to attract the attention we would get if we fired our guns. Pummel him into unconscious and we'll take him with us."

[Player D has Delta attempt to pummel Mr. Goodings into unconsciousness, and Mr. Gooding's response is to attempt to do the same to Delta. For purposes of the illustration it is assumed that all attacks are successful.]

A successful attack by Delta would result in the application of damage to Goodings (hit points) pool 25, stun pool 25, stun defense 10). Delta's punch does 5d6 (5–30 points) of stun damage. If Delta rolled (2+3+4+5+6=20), Goodings would lose stun (20)–stun (10)=(10 stun points) from his stun pool, and (20 stun points)/5=(4 hit points) from his hit points pool. Leaving Goodings at 15 stun points and 21 hit points. At this rate, Gooding's will succumb to unconsciousness after being hit 3 times.

A successful attack by Goodings would result in the application of damage to Delta (hit points pool 20, stun pool 20 stun defense 10+5 (PCP stun defense modifier)). Goodings' punch does 5d6 (5–30 points) of stun damage. If Goodings rolled (2+3+4+5+6=20), Delta would lose stun (20)–stun defense (10+5)=(5 stun points) from his stun pool, and (20 stun points)/5=(4 hit points) from his hit points pool which leaves Delta at 15 stun points, and 16 hit points.

At this rate, Delta could be hit 4 times before succumbing to unconsciousness, or seven times before he would die from HIT POINT damage. He will succeed in subduing Goodings. (In contrast, without the +5 stun defense modifier from PCP, he would receive 10 STUN POINTS per round, succumb to unconsciousness after 2 successful attacks, and would lose his fight with Goodings.

[In 3 rounds, only nine seconds, Goodings has been subdued by Delta. Player D then has Delta take a "recovery action", which allows Delta to restore his depleted STUN POINTS at his normal recovery rate (10 per round). Having taken only two successful attacks, Delta is now at 20/20 STUN POINTS and 12/20 HIT POINTS.]

Player A>"That's too bad! If Gamma hadn't attracted all of that attention down in the yard, we could have taken Goodings here back to the Agency for questioning. Now we'll have to leave him here"

Player A>"Does your character have computer skills? Alpha doesn't."

Player D>"Yes, Delta does."

Player A>"Then see what Delta can do with this computer. I'll have Alpha use his electronics skills to disable transmitter."

Player D highlights the computer with the "operate" cursor and clicks on it to turn the computer on. Clicking on the computer again he calls up a menu presenting options that would normally read:

| | |
|---|---|
| Log on as Jennings/view private files | 50% (alert security 20%) |
| Log on as Goodings/view private files | 10% (alert security 60%) |
| Upload 24 hour lockdown virus | 100% (alert security 0%) |

But since Delta is under the influence of PCP the display now reads

| | |
|---|---|
| Log on as Jennings/view private files | 100% (alert security 00%) |
| Log on as Goodings/view private files | 70% (alert security 00%) |
| Upload 24 hour lockdown virus | 100% (alert security 00%) |

The percentage chances displayed have all been improved by 60% and presented in an altered font to represent the effect of PCP on Gamma's perception of his chances of success. If Player D checks his Character Statistics screen, he will find that his Technique attribute has risen the corresponding 6 points, and is also presented in the same altered font. Player D does not yet realize that the improved figures are an illusory effect of the stimulant Delta has taken. Considering the potential boon to the mission and possibly even the award of bonus XPs for his character Delta, Player D chooses the second option and, with a randomly determined number of 5 . . . sets off the alarms.

The characters leave Goodings and descend the fire escape to the second floor ledge outside. As they make their way to the men's room window, one of the imposters sights them and fires a shot that injures Gamma. Alpha and Gamma make it into the men's room, through the embassy and out to the waiting car in a narrow escape. {As a consequence of drug use, the players suffered the adverse consequences of injury to their characters (Gamma, Delta) and a failed mission (loss of XPs for a completed mission). Although he never took any drugs, even Alpha lost the opportunity for the XPs that would have been awarded for a successful mission as a result of his companion's drug use. Thus, drug abstinent players have self-interest in learning about drug effects so they can educate their companions about their adverse consequences and enhance the chances of mission success.

The program will provide opportunities to interact with computer controlled "artificially intelligent" non-player characters with drug use problems, and XPs will be awarded for helping them avoid drug use (an example was not drawn, but consider the above case where Alpha is a live player and Beta, Gamma, and Delta are computer-controlled NP-Cs). Thus, even groups of drug abstinent players will have motivation to learn about drug effects.

Back at the Agency, the wounded characters are tended to by the agency doctor, who is in fact played by an on-line mentor. The doctor's medical check reveals the presence of drugs in the character's systems, and the doctor/mentor volunteers information to the characters/players about the game/real effects of the drugs that the characters used in the game.

[Use of on-line mentors. The player's need to know the game consequences of substance use/abuse for future gameplay engenders an interest in knowledge about the effects of the drugs as well as interaction with trained drug on-line mentors.]

While the invention has been described with reference to specific embodiments thereof, it will be appreciated that numerous variations, modifications, and embodiments are possible, and accordingly, all such variations, modifications, and embodiments are to be regarded within the spirit and scope of the invention.

We claim:

1. A method of promoting abstinence from substance abuse of a human using a role-playing computer game comprised of the steps of:
   a) assigning a role-playing computer game platform whereby one or more players assume the role of fictitious player-characters capable of interacting in a common virtual environment;
   b) setting an objective for said player-characters to pursue at the discretion of said players;
   c) providing a plurality of actions that each of said player-characters can attempt, wherein said actions are selected by and executed at the discretion of the players of said player-characters;
   d) providing among the said plurality of available actions the option of a player having their player-character self-administer drugs within said virtual environment;
   e) providing a set of character-attributes for said player-characters, wherein said character-attributes influence the outcome of attempts to take any of the said plurality of actions available to said player characters;
   f) providing a plurality of particular drugs for potential use by said player-characters at the discretion of said player-characters' players;
   g) allowing said players of said player-characters the discretion to select and execute commands that result in their said player-characters self-administering said particular drugs within said virtual environment;
   h) defining the effects imposed on each said character-attribute by each of said particular drugs; and
   i) modifying said character-attributes to impose the effects on said character-attributes of said drugs used by said player-character at the discretion of said player-character's player, consequently affecting said player character's probability of success in attempts to take any of said plurality of actions available to said player characters at the discretion of the player-characters' players.

2. A method of promoting abstinence from substance abuse according to claim 1, wherein said objective is a common objective, which is best reached when said players cooperate by directing their respective said player-characters cooperate to obtain said common objective.

3. A method of promoting abstinence from substance abuse according to claim 1, wherein said character attributes describe a player-character's general abilities to succeed at attempts to execute one or more of the said plurality of actions available to said player-character when directed to do so by said player-character's player.

4. A method of promoting abstinence from substance abuse according to claim 1, farther comprising at least one game construct used by the computer game to model a degradation in a player-character's ability to perform at least one of the said plurality of actions modeled in the computer game in response to the use by the player-character of one of a set of drugs of abuse whereby the player can vicariously experience degradation of performance from the use of one of said drugs of abuse.

5. A method of promoting abstinence from substance abuse according to claim 1, further comprising at least one game construct used by the computer game to temporarily move control of at least one action for the player-character from the player to the computer game in response to the use of one of said drugs of abuse by the player-character whereby the player can vicariously experience a loss of control from the use of one of said drugs of abuse.

6. A method of promoting abstinence from substance abuse according to claim 1, further comprising a flashback feature that can be triggered by presentation of stimuli to the player-character where the stimuli was previously associated with use of one of the drugs of abuse by the particular player-character, and the flashback feature can lead to a recurrence of the effects caused by the player-character's previous use of one of the drugs of abuse, whereby the player can vicariously experience a flashback response.

7. A method of promoting abstinence from substance abuse according to claim 1, further comprising an emulation of short-term memory loss through the introduction of gaps in text representing communication involving the player-character whereby the player can vicariously experience an effect of short-term memory loss arising from the use of one of said drugs of abuse.

8. A method of promoting abstinence from substance abuse according to claim 1, further comprising an emulation of an effect of memory consolidation impairing drugs by making temporary the acquisition of skill improvement gained by the player-character while under the influence of memory consolidation impairing drugs.

9. A method of promoting abstinence from substance abuse according to claim 1, wherein at least one of said character attributes is defined by a value.

10. A method of promoting abstinence from substance abuse according to claim 9, wherein modifying said character-attributes to impose the effects on said character-attributes of said drugs self-administered by said player-character at the discretion of said player-character's player include using a modifier, said modifier having a negative impact on said character attribute value when said chosen drug has an adverse drug effect on a character attribute, or a positive impact when said chosen drug has a positive effect on a character attribute.

11. A method of promoting abstinence from substance abuse according to claim 10, including the additional step of incorporating said modifier to said value to determine the outcome of an action taken by said player-character at the discretion of said player-character's player.

12. A method of promoting abstinence from substance abuse according to claim 1, wherein said player-characters can be created and manipulated as non-player-characters by said computer game.

13. A method of promoting abstinence from substance abuse according to claim 1, further comprising the step of assigning at least one of said player-characters to be a mentor, wherein said mentor will be an official source of accurate information about drugs.

14. A method of promoting abstinence from substance abuse according to claim 1, further comprising the steps of:
   a) monitoring the actions taken by said players to direct their respective said player-characters to determine when said players direct their said player-characters to increase or decrease their virtual drug use;
   b) correlating changes in players' direction of player-character actions corresponding to said increase or decrease of said players' direction of player-character virtual drug use with exposure of said players to various components of said computer game; and
   c) changing the components of said computer game for the purpose of decreasing said player directed player-character virtual drug use.

15. A method of promoting abstinence from substance abuse according to claim 1, further comprising the steps of:
   a) administering surveys to said players over the Internet; and
   b) providing incentives to said players to complete said surveys by including within-game rewards allotted to said players' player-characters in return for said player-character's players completing said surveys.

16. A method of promoting abstinence from substance abuse according to claim 15, wherein said within-game rewards includes granting access to the said player-characters of said players who have completed said surveys to game-virtual areas that are not accessible to the said player-characters of said players who did not complete said survey.

17. A method of promoting abstinence from substance abuse according to claim 2, further including the step of advancing the social placement of a player-character within said virtual environment based on whether said actions taken by said player-character (at the discretion and direction of their said players) within said virtual environment assist other player-characters reach said common objective.

18. A method of promoting abstinence from substance abuse according to claim 1, further including the step of advancing the social placement of a player-character within said virtual environment based on whether said actions taken by said player-character assist another player-character (as controlled by that player character's player) or non-player-character (as controlled by artificial intelligence programming) resist choosing to take said drugs.

19. A method of promoting abstinence from substance abuse according to claim 1, further including the step of providing a set of skills describing said player-characters' ability to perform specific of said actions at the discretion and direction of said player-character's player.

20. A method of promoting abstinence from substance abuse according to claim 1, further including the step of emphasizing the incompatibility of substance abuse with reaching said objective.

21. A method of promoting abstinence from substance abuse according to claim 2, further including the step of emphasizing the incompatibility of substance abuse with reaching said common objective.

22. A method of promoting abstinence from substance abuse according to claim 1, further including the step of attaching negative consequences to the abuse of alcohol, tobacco, and other drugs, conditioning avoidance of these substances based on protection of a human's player-character.

23. A method of promoting abstinence from substance abuse according to claim 1, further including the step of accurately portraying the effects of alcohol, tobacco, and other drugs on said player-character causing an enhancement in the likelihood of stimulus generalization of the virtual stimuli of alcohol, tobacco, and other drugs portrayed within the game to the real stimuli of actual alcohol, tobacco, and other drugs in the real world, thereby enhancing the transfer of conditioned avoidance of these game substances within the game to avoidance of the real substances by said human in real life after having used said role playing game.

24. A method of promoting abstinence from substance abuse according to claim 1, further including the step of accurately portraying the effects of sensitization, habituation, and withdrawal to alcohol, tobacco, and other drugs on said player-character.

25. A method of promoting abstinence from substance abuse of a human using a role-playing computer game comprising the steps of:
   a) assigning a role-playing computer game platform whereby players assume fictitious player-characters capable of interacting in a common virtual environment;
   b) accurately portraying within said common virtual environment the effects of alcohol, tobacco, and other drugs on said player-characters;
   c) enhancing the likelihood of stimulus generalization by said human of the virtual stimuli of alcohol, tobacco, and other drugs portrayed within the game to the real stimuli of actual alcohol, tobacco, and other drugs in the real world, and
   d) enhancing the transfer of conditioned avoidance of these game substances within the game to avoidance of the real substances by said human in real life after having used said role playing game.

26. A method of promoting abstinence from substance abuse of a human using a role-playing computer game comprised of the steps of:
   a) assigning a role-playing computer game platform whereby one or more players assume the role of fictitious player-characters capable of interacting in a common virtual environment;
   b) setting an objective for said player-characters to pursue at the discretion of said players, wherein said objective is a common objective, which is best reached when said players cooperate by directing their respective said player-characters to cooperate to obtain said common objective;
   c) providing a plurality of actions that each of said player-characters can attempt, wherein said actions are selected by and executed at the discretion of the players of said player-characters;
   d) providing among the said plurality of available actions the option of a player having their player-character self-administer drugs within said virtual environment;
   e) providing a set of character-attributes for said player-characters, wherein at least one of said character-attributes is defined by a value, and influence the outcome of attempts to take any of the said plurality of actions available to said player characters;
   f) providing a plurality of particular drugs for potential use by said player-characters at the discretion of said player-characters' players;
   g) allowing said players of said player-characters the discretion to select and execute commands that result in their said player-characters self-administering said particular drugs within said virtual environment;

h) defining the effects imposed on each said character-attribute by each of said particular drugs; and i) modifying said character-attributes to impose the effects on said character-attributes of said drugs used by said player-character at the discretion of said player-character's player, consequently affecting said player character's probability of success in attempts to take any of said plurality of actions available to said player characters at the discretion of the player-characters' players.

* * * * *

UNITED STATES PATENT AND TRADEMARK OFFICE
CERTIFICATE OF CORRECTION

PATENT NO. : 6,561,811 B2
DATED : May 13, 2003
INVENTOR(S) : Rapoza et al.

It is certified that error appears in the above-identified patent and that said Letters Patent is hereby corrected as shown below:

Column 1,
Line 3, insert the following:
-- This invention was made with government support under DA11572-01A1 awarded by the National Institute on Drug Abuse. The Government has certain rights in the invention. --

Column 4,
Line 8, the word "farther" should read -- further --.

Signed and Sealed this

Twenty-seventh Day of July, 2004

JON W. DUDAS
*Acting Director of the United States Patent and Trademark Office*